United States Patent
Ozturk et al.

(10) Patent No.: US 10,321,466 B2
(45) Date of Patent: Jun. 11, 2019

(54) TECHNIQUES FOR MANAGING A LOGICAL TRAFFIC CONNECTION THAT USES DATA AGGREGATION

(71) Applicant: QUALCOMM Incorporated, San Diego, CA (US)

(72) Inventors: Ozcan Ozturk, San Diego, CA (US); Arnaud Meylan, San Diego, CA (US); Sivaramakrishna Veerepalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 15/672,566

(22) Filed: Aug. 9, 2017

(65) Prior Publication Data

US 2018/0049208 A1 Feb. 15, 2018

Related U.S. Application Data

(60) Provisional application No. 62/374,540, filed on Aug. 12, 2016.

(51) Int. Cl.
*H04L 12/26* (2006.01)
*H04W 28/08* (2009.01)
(Continued)

(52) U.S. Cl.
CPC ..... *H04W 72/0486* (2013.01); *H04L 43/0882* (2013.01); *H04L 45/245* (2013.01);
(Continued)

(58) Field of Classification Search
CPC .. H04L 47/10; H04W 28/02; H04W 28/0205; H04W 28/021; H04W 28/0247;
(Continued)

(56) References Cited

U.S. PATENT DOCUMENTS 9,894,614 B2 * 2/2018 Su .................. H04L 1/1825
10,079,657 B2 * 9/2018 Balasubramanian .................
H04L 1/1812

(Continued)

FOREIGN PATENT DOCUMENTS

| WO | WO-2013052805 A1 | 4/2013 |
| WO | WO-2016064499 A1 | 4/2016 |
| WO | WO-2016105568 A1 | 6/2016 |

OTHER PUBLICATIONS

ISA/EP, International Search Report and Written Opinion of the International Searching Authority, Int'l Application No. PCT/US2017/046306, dated Nov. 15, 2017, European Patent Office, Rijswijk, NL, 15 pgs.

(Continued)

Primary Examiner — Sharad Rampuria
(74) Attorney, Agent, or Firm — Holland & Hart LLP

(57) ABSTRACT

Techniques for wireless communication at a user equipment (UE) are described. One method includes receiving, from a first access point using a first radio access technology (RAT), a configuration associated with a logical traffic connection, in which the configuration includes at least one parameter for communicating data associated with the logical traffic connection via a second access point associated with a second RAT; determining a buffer reporting value associated with the logical traffic connection based at least in part on a total amount of data buffered in a packet data convergence protocol (PDCP) queue associated with the logical traffic connection and the at least one parameter; and transmitting a buffer status report (BSR) including the buffer reporting value to the first access point.

27 Claims, 14 Drawing Sheets

(51) Int. Cl.
  *H04W 48/16* (2009.01)
  *H04W 72/04* (2009.01)
  *H04W 72/12* (2009.01)
  *H04W 76/36* (2018.01)
  *H04W 88/06* (2009.01)
  *H04L 12/709* (2013.01)
  *H04L 12/803* (2013.01)

(52) U.S. Cl.
  CPC ......... *H04L 47/125* (2013.01); *H04W 28/085* (2013.01); *H04W 72/1284* (2013.01); *H04L 43/16* (2013.01); *H04W 48/16* (2013.01); *H04W 76/36* (2018.02); *H04W 88/06* (2013.01)

(58) Field of Classification Search
  CPC ......... H04W 28/0252; H04W 28/0257; H04W 28/0263; H04W 28/0268; H04W 28/0273
  See application file for complete search history.

(56) References Cited

U.S. PATENT DOCUMENTS

| | | |
|---|---|---|
| 2014/0321376 A1 | 10/2014 | Damnjanovic et al. |
| 2015/0264631 A1* | 9/2015 | Zhang ............... H04W 48/08 370/329 |
| 2016/0037380 A1 | 2/2016 | Ozturk et al. |
| 2018/0199354 A1* | 7/2018 | Yi ........................ H04W 28/02 |

OTHER PUBLICATIONS

LG Electronics Inc, "BSR Issue in UL LWA Bearer," 3GPP TSG-RAN WG2 Meeting #94, R2-164156, Nanjing, China, May 23-27, 2016, 3 pgs., XP051105467, 3rd Generation Partnership Project.

* cited by examiner

TECHNIQUES FOR MANAGING A LOGICAL TRAFFIC CONNECTION THAT USES DATA AGGREGATION

CROSS REFERENCES

The present Application for Patent claims priority to U.S. Provisional Patent Application No. 62/374,540 by Ozturk, et al., entitled "Techniques For Managing A Logical Traffic Connection That Uses Data Aggregation," filed Aug. 12, 2016, assigned to the assignee hereof.

BACKGROUND

Field of the Disclosure

The present disclosure, for example, relates to wireless communication systems, and more particularly to techniques for managing a logical traffic connection that uses data aggregation (e.g., a logical traffic connection that uses wireless wide area network (WWAN)/wireless local area network (WLAN) traffic aggregation).

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipment (UE) devices. A base station may communicate with UEs on downlink channels (e.g., for transmissions from a base station to a UE) and uplink channels (e.g., for transmissions from a UE to a base station).

In some examples, a UE may communicate with a first access point (e.g., a base station) and a second access point (e.g., a WLAN access point). The first access point and the second access point may be associated with a logical traffic connection between the UE and a peer entity (e.g., an application server, a content server, another UE, etc.). For uplink transmissions over the logical traffic connection, the UE may transmit a first set of data to the first access point and a second set of data to the second access point. The second access point may transmit the second set of data to the first access point. The first access point may aggregate the first set of data and the second set of data and forward an aggregate data stream over a WWAN to the peer entity. The aggregation performed by the first access point may be referred to as radio access network (RAN) aggregation. When the WWAN includes a Long Term Evolution (LTE) or LTE-Advance (LTE-A) network, the aggregation may be referred to as LTE Wi-Fi aggregation (LWA).

SUMMARY

A method of wireless communication is described. The method may include receiving, from a first access point using a first radio access technology (RAT), a configuration associated with a logical traffic connection, the configuration comprising at least one parameter for communicating data associated with the logical traffic connection via a second access point associated with a second RAT, estimating a subset of a total amount of data buffered in a packet data convergence protocol (PDCP) queue associated with the logical traffic connection expected to be transmitted via the second access point for a time period ending at an expected time of receipt of an uplink grant from the first access point, determining a buffer reporting value associated with the logical traffic connection based at least in part on the subset of the total amount of data and the at least one parameter, and transmitting a buffer status report (BSR) including the buffer reporting value to the first access point.

An apparatus for wireless communication is described. The apparatus may include means for receiving, from a first access point using a first radio access technology (RAT), a configuration associated with a logical traffic connection, the configuration comprising at least one parameter for communicating data associated with the logical traffic connection via a second access point associated with a second RAT, means for estimating a subset of a total amount of data buffered in a packet data convergence protocol (PDCP) queue associated with the logical traffic connection expected to be transmitted via the second access point for a time period ending at an expected time of receipt of an uplink grant from the first access point, means for determining a buffer reporting value associated with the logical traffic connection based at least in part on the subset of the total amount of data and the at least one parameter, and means for transmitting a buffer status report (BSR) including the buffer reporting value to the first access point.

Another apparatus for wireless communication is described. The apparatus may include a processor, memory in electronic communication with the processor, and instructions stored in the memory. The instructions may be operable to cause the processor to receive, from a first access point using a first radio access technology (RAT), a configuration associated with a logical traffic connection, the configuration comprising at least one parameter for communicating data associated with the logical traffic connection via a second access point associated with a second RAT, estimate a subset of a total amount of data buffered in a packet data convergence protocol (PDCP) queue associated with the logical traffic connection expected to be transmitted via the second access point for a time period ending at an expected time of receipt of an uplink grant from the first access point, determine a buffer reporting value associated with the logical traffic connection based at least in part on the subset of the total amount of data and the at least one parameter, and transmit a buffer status report (BSR) including the buffer reporting value to the first access point.

A non-transitory computer readable medium for wireless communication is described. The non-transitory computer-readable medium may include instructions operable to cause a processor to receive, from a first access point using a first radio access technology (RAT), a configuration associated with a logical traffic connection, the configuration comprising at least one parameter for communicating data associated with the logical traffic connection via a second access point associated with a second RAT, estimate a subset of a total amount of data buffered in a packet data convergence protocol (PDCP) queue associated with the logical traffic connection expected to be transmitted via the second access point for a time period ending at an expected time of receipt of an uplink grant from the first access point, determine a buffer reporting value associated with the logical traffic connection based at least in part on the subset of the total amount of data and the at least one parameter, and transmit a buffer status report (BSR) including the buffer reporting value to the first access point.

In some examples of the method, apparatus, and non-transitory computer-readable medium described above, the subset of the total amount of data may be estimated based at least in part on an estimated data rate associated with communicating with the second access point using the second RAT, a minimum data size associated with communicating with the second access point using the second RAT, a maximum data size associated with communicating with the second access point using the second RAT, a history of uplink transmission scheduling by the first access point, or combinations thereof.

In some examples of the method, apparatus, and non-transitory computer-readable medium described above, the at least one parameter comprises at least one of a ratio of data to be transmitted via the second access point and the total amount of data buffered in the PDCP queue associated with the logical traffic connection, a maximum data limit for communicating the data associated with the logical traffic connection via the second access point, a minimum data threshold for communicating the data associated with the logical traffic connection via the second access point, a network identifier of the second access point, or a set of tokens for communicating data associated with the logical traffic connection via the second access point.

Some examples of the method, apparatus, and non-transitory computer-readable medium described above may further include processes, features, means, or instructions for receiving an uplink grant for transmitting to the first access point using the first RAT, the uplink grant based at least in part on the buffer reporting value. Some examples of the method, apparatus, and non-transitory computer-readable medium described above may further include processes, features, means, or instructions for transmitting a first subset of the total amount of data to the first access point using the first RAT, in accordance with the received uplink grant. Some examples of the method, apparatus, and non-transitory computer-readable medium described above may further include processes, features, means, or instructions for pushing a second subset of the total amount of data to a medium access control (MAC) queue associated with the second RAT.

Some examples of the method, apparatus, and non-transitory computer-readable medium described above may further include processes, features, means, or instructions for maintaining the second subset of the total amount of data in the PDCP queue. Some examples of the method, apparatus, and non-transitory computer-readable medium described above may further include processes, features, means, or instructions for determining a second buffer reporting value based at least in part on the second subset of the total amount of data, and based at least in part on receiving an indication of a transmission error for the second subset of the total amount of data using the second RAT.

Some examples of the method, apparatus, and non-transitory computer-readable medium described above may further include processes, features, means, or instructions for determining a second buffer reporting value based at least in part on the first subset of the total amount of data, the second subset of the total amount of data, an indication of a queue status for the MAC queue associated with the second RAT, an amount of additional data in the PDCP queue since the transmission of the BSR, the at least one parameter, or combinations thereof. Some examples of the method, apparatus, and non-transitory computer-readable medium described above may further include processes, features, means, or instructions for transmitting a second BSR including the second buffer reporting value to the first access point.

Some examples of the method, apparatus, and non-transitory computer-readable medium described above may further include processes, features, means, or instructions for determining that a parameter for communication with the second access point using the second RAT fails to satisfy a threshold. Some examples of the method, apparatus, and non-transitory computer-readable medium described above may further include processes, features, means, or instructions for determining a second buffer reporting value based at least in part on the determination that the parameter for communication with the second access point using the second RAT fails to satisfy the threshold.

In some examples of the method, apparatus, and non-transitory computer-readable medium described above, the parameter for communication with the second access point using the second RAT comprises at least one of a time to transmit using the second RAT or a channel metric associated with the second RAT.

In some examples of the method, apparatus, and non-transitory computer-readable medium described above, the first RAT comprises a wireless wide area network (WWAN) technology and the second RAT comprises a wireless local area network (WLAN) technology.

In some examples of the method, apparatus, and non-transitory computer-readable medium described above, the first RAT comprises a first wireless wide area network (WWAN) technology and the second RAT comprises a second WWAN technology.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
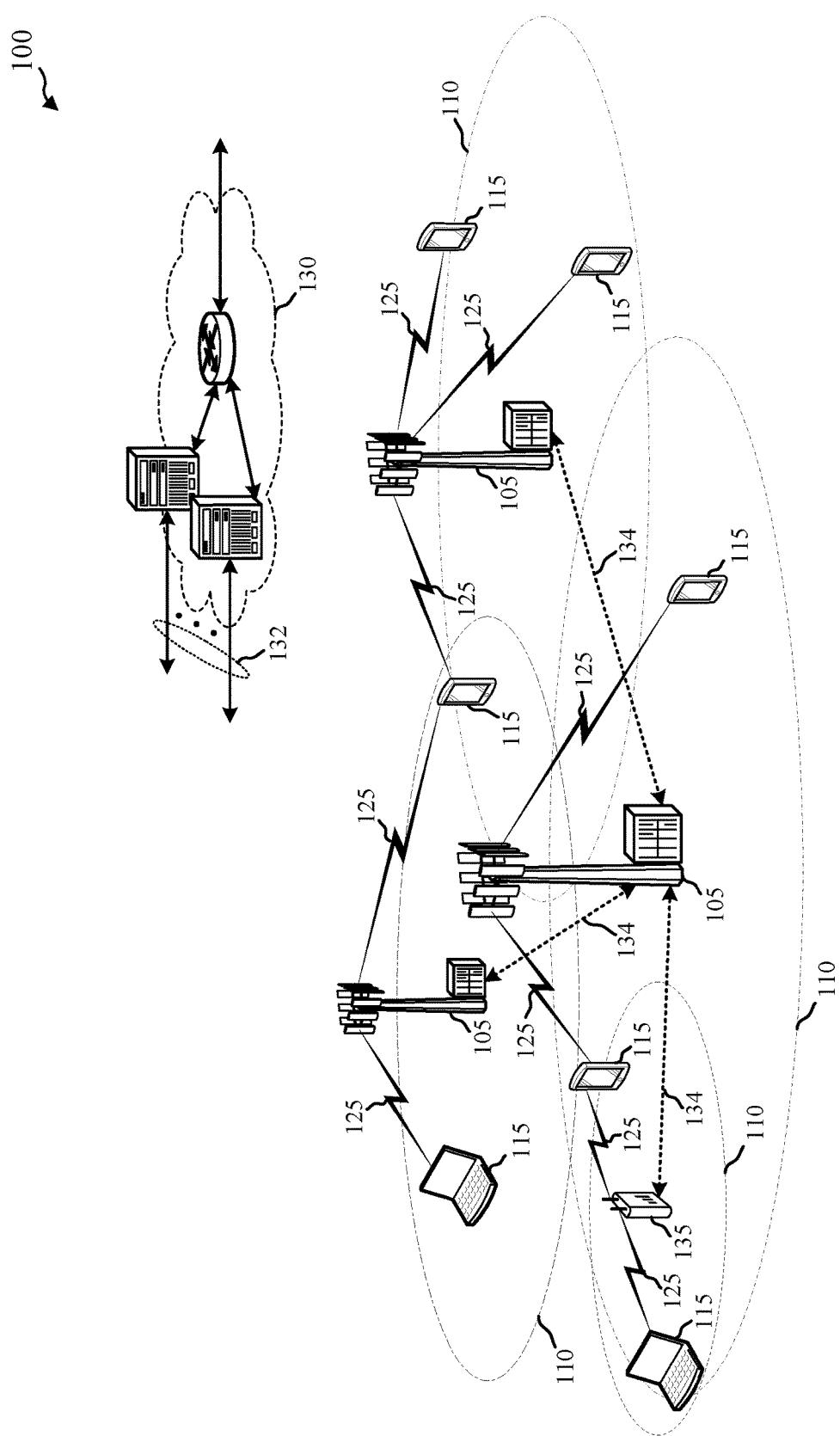
FIG. 1 illustrates an example of a wireless communication system, in accordance with various aspects of the present disclosure.

The present disclosure relates to techniques for managing a logical traffic connection that uses data aggregation (e.g., a logical traffic connection that uses WWAN/WLAN traffic aggregation). A UE in communication with a first access point (e.g., a WWAN access point or base station) using a first radio access technology (RAT) may establish a logical traffic connection with a peer entity (e.g., an application server, a content server, another UE, etc.) via the first access point. The UE may receive, from the first access point, a configuration associated with the logical traffic connection. The configuration may include at least one parameter for communicating data associated with the logical traffic connection via a second access point associated with a second RAT. The second access point may, for example, be an access point associated with a different WWAN or a WLAN access point. Uplink transmissions from a UE to a WLAN access point may be opportunistic (e.g., not scheduled and dependent on a contention procedure or distributed coordination function (DCF)). Uplink transmissions from a UE to a WLAN access point may also be of variable size. In some examples, the parameter(s) may include at least one of a ratio of data to be transmitted via the second access point, a total amount of data for transmission to the peer entity buffered in a PDCP queue associated with the logical traffic connection, a maximum data limit for communicating the data associated with the logical traffic connection via the second access point, a minimum data threshold for communicating the data associated with the logical traffic connection via the second access point, a network identifier of the second access point, or a set of tokens for communicating data associated with the logical traffic connection via the second access point.

Upon trigger of a BSR (e.g., availability of data in a PDCP queue), the UE may determine a buffer reporting value associated with the logical traffic connection. The buffer reporting value may be based at least in part on a total amount of data for transmission to the peer entity buffered in a PDCP queue associated with the logical traffic connection. The buffer reporting value may also be based at least in part on the parameter(s) for communicating data associated with the logical traffic connection via the second access point. In this manner, the buffer reporting value may be discounted to exclude data buffered in the PDCP queue that is intended to be transmitted over the logical traffic connection via the second access point, and may instead be based on data buffered in the PDCP queue that is intended to be transmitted over the logical traffic connection via the first access point. The UE may transmit a BSR including the buffer reporting value to the first access point.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communication system 100, in accordance with various aspects of the present disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, X2, X3, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network or New Radio (NR) network. In LTE/LTE-A networks, the term evolved Node B (eNB) may be used to describe a base station 105, while the term UE may be used to describe a UE 115. In NR networks, the term next generation Node B (gNB) may be used to describe the base stations 105. The wireless communication system 100 may be a Heterogeneous LTE/LTE-A/NR network in which different types of eNBs/gNBs provide coverage for various geographical regions. For example, each eNB/gNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, shared, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

In some examples, the wireless communication system 100 may include multiple networks employing the same or different RATs. For example, the wireless communication system 100 may include a WWAN and a WLAN or first and second WWANs. The WLAN may include one or more WLAN access points 135. The first and second WWANs may employ different base stations 105 in different locations, or some of the base stations 105 may be collocated, in some cases.

The wireless communication system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or PDCP layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency.

In the control plane, the RRC protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlinks (DLs), from a base station 105 to a UE 115, or uplinks (ULs), from a UE 115 to a base station 105. The downlinks may also be called forward links, while the uplinks may also be called reverse links.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or dual-connectivity operation. Carrier aggregation refers to a scenario where a UE 115 has one WWAN connection (e.g., on RRC connection) but is configured for operation via multiple carriers while dual-connectivity refers to a scenario where a UE 115 has multiple WWAN connections (e.g., with the same or different types of RATs). A carrier may also be referred to as a component carrier (CC), a layer, a channel, etc. The terms "carrier," "component carrier," "cell," and "channel" may be used interchangeably herein. Carrier aggregation may be used with both FDD and TDD component carriers.

In some examples, the wireless communication system 100 may support operation over a dedicated radio frequency spectrum band (e.g., a radio frequency spectrum that is licensed to an operator) and/or a shared radio frequency spectrum band. Shared radio frequency spectrum bands include unlicensed radio frequency spectrum bands open for use by any device meeting certain technical requirements (e.g., limited transmission power, etc.) on a contention-based access control (e.g., listen-before-talk, etc.) basis, and radio frequency spectrum bands that are available for use by multiple operators in an equally shared or prioritized manner.

In some examples of the wireless communication system 100, a UE 115 served by a base station 105 of a WWAN may be configured to operate using a RAN aggregation mode (e.g., dual-connectivity, LWA, etc.). The UE may receive, from the base station, a configuration associated with the logical traffic connection. The configuration may include at least one parameter for communicating data associated with the logical traffic connection via a second access point (e.g., a second WWAN access point or WLAN access point). In some examples, the second access point may be associated with operation via shared spectrum resources. In some examples, the parameter(s) may include at least one of a ratio of data to be transmitted via the second access point, a total amount of data for transmission to the peer entity buffered in a PDCP queue associated with the logical traffic connection, a maximum data limit for communicating the data associated with the logical traffic connection via the second access point, a minimum data threshold for communicating the data associated with the logical traffic connection via the second access point, a network identifier of the second access point, or a set of tokens for communicating data associated with the logical traffic connection via the second access point.

Upon trigger of a BSR (e.g., availability of data in a PDCP queue), the UE may determine a buffer reporting value associated with the logical traffic connection. The buffer reporting value may be based at least in part on a total amount of data for transmission to the peer entity buffered in a PDCP queue associated with the logical traffic connection. The buffer reporting value may also be based at least in part on the parameter(s) for communicating data associated with the logical traffic connection via the second access point. In this manner, the buffer reporting value may be discounted to exclude data buffered in the PDCP queue that is intended to be transmitted over the logical traffic connection via the second access point, and may instead be based on data buffered in the PDCP queue that is intended to be transmitted over the logical traffic connection via the base station. The UE may transmit a BSR including the buffer reporting value to the base station.

Figure 2:
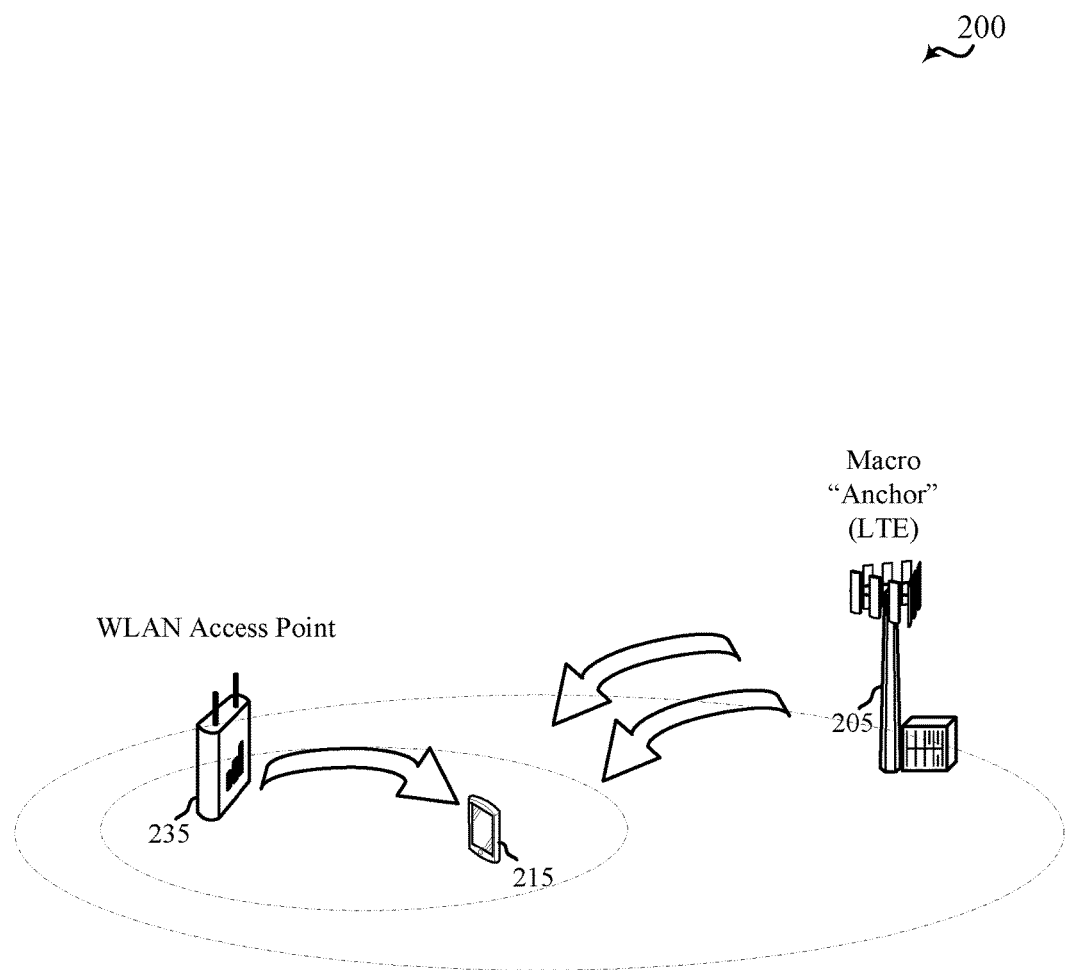
FIG. 2 illustrates an example of a wireless communication system that uses LWA, in accordance with various aspects of the present disclosure.

FIG. 2 illustrates an example of a wireless communication system 200 that uses LWA, in accordance with various aspects of the present disclosure. The wireless communication system 200 may be an example of a portion of the wireless communication system 100 and may include a LTE/LTE-A macro "anchor" base station 205, a UE 215, and a WLAN access point 235. The base station 205 and WLAN access point 235 may be examples of aspects of the base stations 105 and WLAN access points 135 described with reference to FIG. 1, and the UE 215 may be an example of aspects of the UEs 115 described with reference to FIG. 1.

The WLAN access point 235 may be external to the LTE/LTE-A network associated with base station 305, or may be managed as an LTE/LTE-A network extension. The WLAN access point 235 may therefore operate as an additional opportunistic booster of LTE/LTE-A capacity. The base station 205 may provide the UE 215 access to a carrier (e.g., a licensed carrier) in a dedicated (or licensed) radio frequency spectrum band, and the WLAN access point 235 may provide the UE 215 access to a carrier (e.g., an unlicensed carrier) in a shared (or unlicensed) radio frequency spectrum band. The unlicensed carrier may be provided using an IEEE Standard 802.11 PHY/MAC (or unlicensed lower layers). The licensed carrier and unlicensed carrier may be aggregated, using LWA, to form a logical traffic connection (or aggregated pipe) coordinated at the RAN level. The WLAN access point 235 may be collocated or non-collocated with the base station 205.

Figure 3:
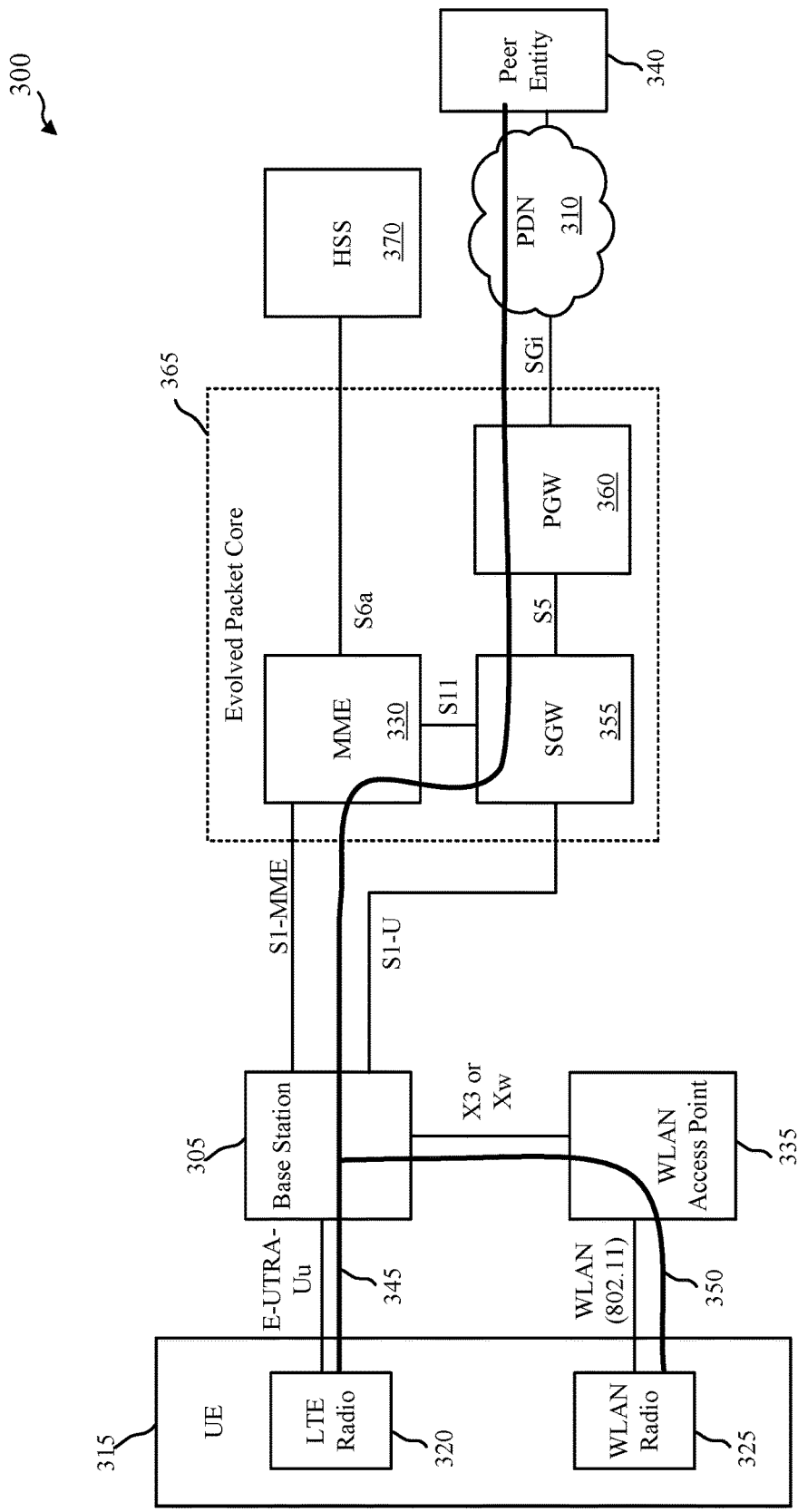
FIG. 3 shows a block diagram conceptually illustrating an example of a logical traffic connection between a UE and a peer entity, in accordance with various aspects of the present disclosure.

FIG. 3 shows a block diagram 300 conceptually illustrating an example of a logical traffic connection between a UE 315 and a peer entity 340, in accordance with various aspects of the present disclosure. The logical traffic connection may include a first data path 345 between the UE 315 and the peer entity 340, which first data path 345 is routed through a base station 305 (e.g., a base station of an eNB), and a second data path 350 between the UE 315 and the peer entity 340, which second data path 350 is routed through a WLAN access point 335 and the base station 305. The first data path 345 and the second data path 350 are merged (for uplink transmissions from the UE 315) and split (for downlink transmissions to the UE 315), by aggregation hardware, firmware, and/or software hosted at the base station 305. The first data path 345 and the second data path 350 are shown within the context of a wireless communication system that aggregates transmissions via WWAN (e.g., LTE/LTE-A) and WLAN (e.g., Wi-Fi) RATs. The base station 305 and WLAN access point 335 may be collocated, or non-collocated but in communication with each other.

The logical traffic connection between the UE 315 and the peer entity 340 may be routed from the base station 305, through an evolved packet core (EPC) 365 (e.g., a core network such as the core network 130 described with reference to FIG. 1), and through a packet data network (PDN) 310 (e.g., the Internet) to the peer entity 340. In some examples, the logical traffic connection may be routed through more than one PDN. In some examples, the peer entity 340 may be an entity within the PDN 310 or EPC 365. If the peer entity 340 is included in the EPC 365, the logical traffic connection may terminate within the EPC 365 without being routed through the PDN 310.

The UE 315 may be a multi-mode UE and include, for example, an LTE/LTE-A radio 320 and a WLAN radio 325. The EPC 365 may include a mobility management entity (MME) 330, a serving gateway (SGW) 355, and a PDN gateway (PGW) 360. A home subscriber system (HSS) 370 may be communicatively coupled with the MME 330.

The base station 305 may be configured to provide the UE 315 with access to the PDN 310 by aggregating (e.g., in the data plane) data transmitted from the LTE/LTE-A radio 320 to the base station 305 on one or more LTE component carriers and/or data transmitted from the WLAN radio 325 to the WLAN access point 335 on one or more WLAN carriers. In some examples, the aggregation may occur at the RLC layer or PDCP layer, which may terminate at the base station 305. The data transmitted from the WLAN radio 325 to the WLAN access point 335 may be transmitted from the WLAN access point 335 to the base station 305. Using this access to the PDN 310, the UE 315 may establish a logical traffic connection with, and communicate with, the peer entity 340. The base station 305 may provide access to the PDN 510 through the EPC 565.

The MME 330 may be the control node that processes control plane signaling between the UE 315 and the EPC 365. The MME 330 may provide bearer and connection management. The MME 330 may, therefore, be responsible for idle mode UE tracking and paging, bearer activation and deactivation, and SGW selection for the UE 315. The MME 330 may communicate with the base station 305 over an Sl-MME interface. The MME 330 may additionally authenticate the UE 315 and implement Non-Access Stratum (NAS) signaling with the UE 315.

The HSS 370 may, among other functions, store subscriber data, manage roaming restrictions, manage accessible access point names (APNs) for a subscriber, and associate subscribers with MMES 330. The HSS 370 may communicate with the MME 330 over an Sha interface defined by the Evolved Packet System (EPS) architecture standardized by the 3GPP organization.

All user IP packets transmitted over LTE/LTE-A may be transferred through the base station 305 to the SGW 355, which may be connected to the PGW 360 over an S5 signaling interface, and to the MME 330 over an Sll signaling interface. The SGW 355 may reside in the user plane and act as a mobility anchor for inter-base station handovers and handovers between different access technologies. The PGW 360 may provide UE IP address allocation as well as other functions.

The PGW 360 may provide connectivity to one or more external packet data networks, such as PDN 310 (e.g., over an SGi signaling interface). The PDN 310 may include the Internet, an Intranet, an IP Multimedia Subsystem (IMS), a Packet-Switched (PS) Streaming Service (PSS), and/or other types of PDNs.

In the present example, user plane data between the UE 315 and the EPC 365 may traverse the same set of one or more EPS bearers, irrespective of whether the traffic flows over path 345 or path 350. Signaling or control plane data related to the set of one or more EPS bearers may be transmitted between the LTE/LTE-A radio 320 of the UE 315 and the MME 330 of the EPC 365 by way of the base station 305. EPS bearer-related data between the UE 315 and the WLAN AP 335 may be routed to the base station 305, and then to the EPC 365. In this way, all EPS bearer-related data may be forwarded along the same path between the base station 305, the EPC 365, the PDN 310, and the peer entity 340.

Figure 4:
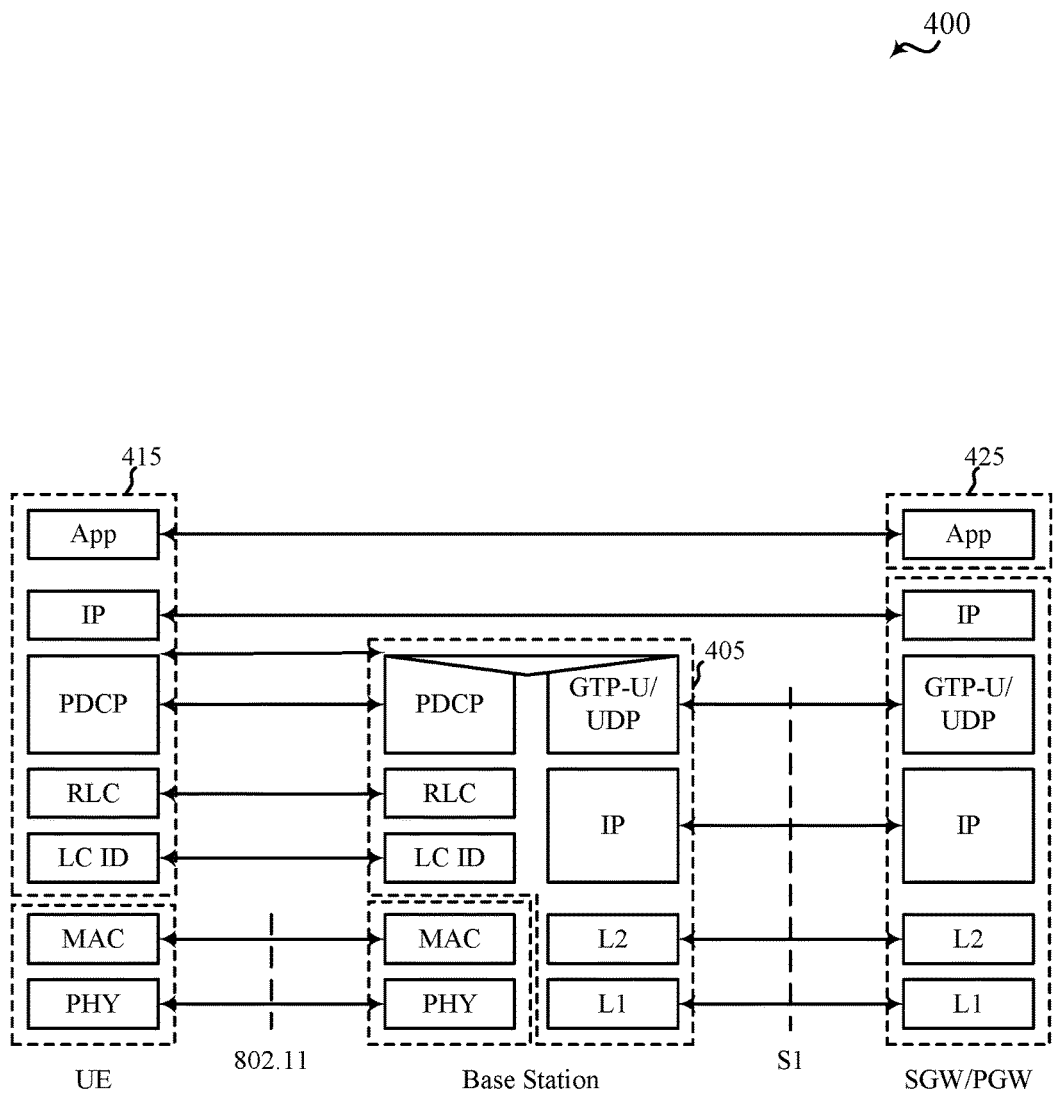
FIG. 4 shows an example of LWA in terms of user plane protocol stacks of various devices, in accordance with various aspects of the present disclosure.

FIG. 4 shows an example 400 of user plane protocol stacks supporting LWA, in accordance with various aspects of the present disclosure. The user plane protocol stacks are illustrated for a UE 415, a base station 405, and a SGW/PGW 425. By way of example, the UE 415 may be an example of aspects of one or more of the UEs 115, 215, or 315 described with reference to FIG. 1, 2, or 3. The base station 405 may be an example of aspects of one or more of the base stations 105 or 205 described with reference to FIG. 1 or 2. The SGW/PGW 425 may be an example of aspects of the core network 130 described with reference to FIG. 1, or aspects of the SGW 355 and PGW 360 described with reference to FIG. 3.

The UE 415 may implement an application (App) layer, an IP layer, a PDCP layer, an RLC layer, a logical channel identity (LC ID) layer, a MAC layer, and a PHY layer. The lower layers (e.g., the PDCP layer, RLC layer, LC ID layer, MAC layer, and PHY layer) may communicate with corresponding layers implemented by the base station 405, while the higher layers (e.g., the App layer and IP layer) may communicate with corresponding layers implemented by the SGW/PGW 425. The base station 405 may further implement a GPRS tunneling protocol (GTP-U) and/or user datagram protocol (UDP) layer, an IP layer, an L2 layer, and an L1 layer, which layers may communicate with corresponding layers implemented by the SGW/PGW 425 over an S1 interface.

By way of example, the functionality of a WLAN access point or similar WLAN radio functionality is shown to be collocated with (or integrated into) the base station 405. WLAN radio functionality is also integrated into the UE 415. In some examples, the WLAN radio functionality may be incorporated into the MAC and PHY layers of the base station 405 and UE 415 and implemented using an IEEE 802.11 interface. Also by way of example, the base station 405 may aggregate data transmitted by the UE 415 over a logical traffic connection including a first data path associated with an LTE/LTE-A RAT and a second data path associated with a Wi-Fi RAT. By way of example, the base station 405 may aggregate data transmitted by the UE 415 over the logical traffic connection at the RLC layer. Alternatively, the data transmitted by the UE 415 over the logical traffic connection could be aggregated at the PDCP layer.

Figure 5:
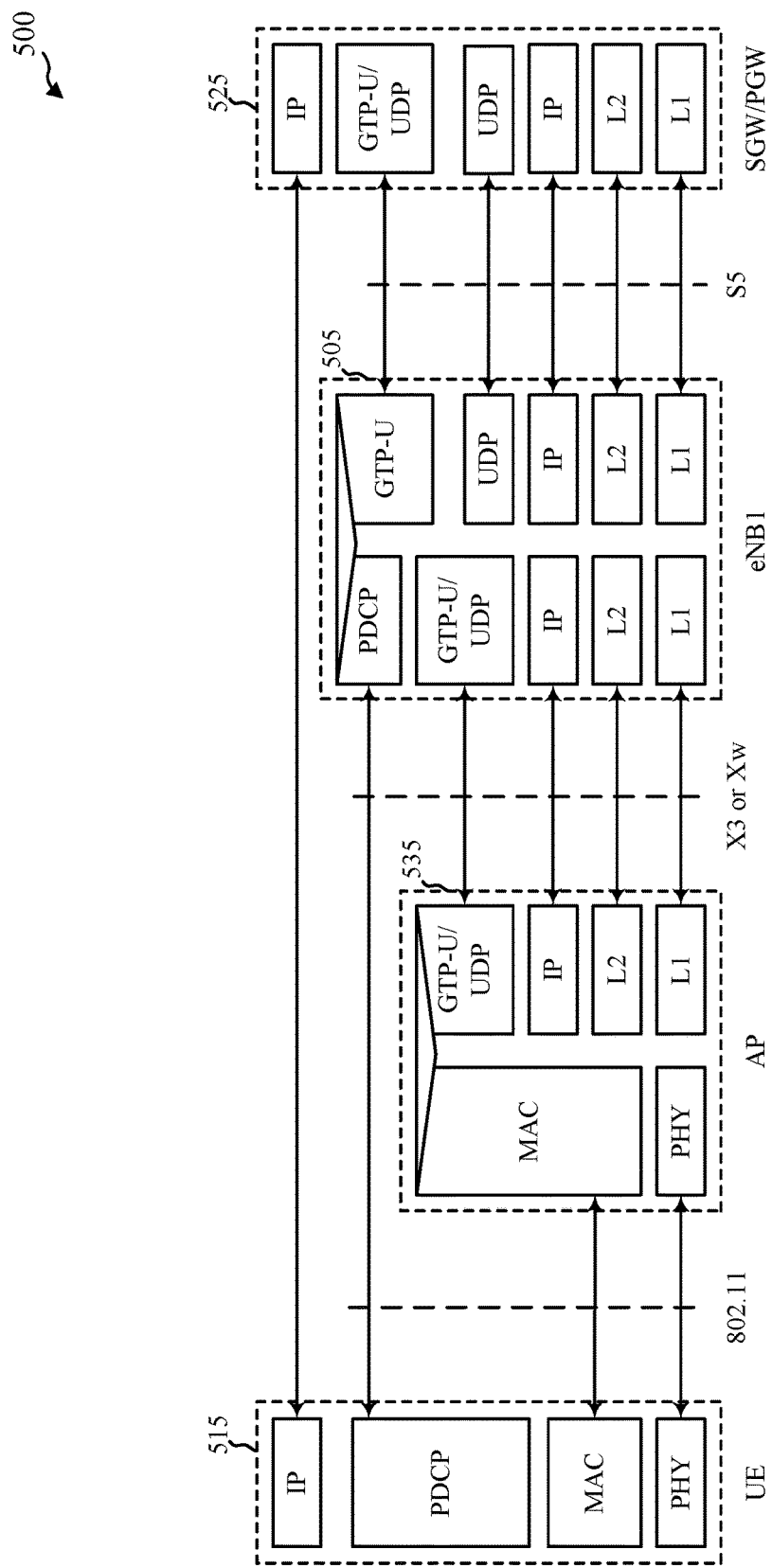
FIG. 5 shows an example of LWA in terms of user plane protocol stacks of various devices, in accordance with various aspects of the present disclosure.

FIG. 5 shows an example 500 of user plane protocol stacks of supporting LWA, in accordance with various aspects of the present disclosure. The user plane protocol stacks are illustrated for a UE 515, a WLAN access point 535, a base station 505, and a SGW/PGW 525. By way of example, the UE 515 may be an example of aspects of one or more of the UEs 115, 215, or 315 described with reference to FIG. 1, 2, or 3. The WLAN access point 535 may be an example of aspects of the WLAN access point 135, 235, or 335 described with reference to FIG. 1, 2, or 3. The base station 505 may be an example of aspects of one or more of the base stations 105 or 205 described with reference to FIG. 1 or 2. The SGW/PGW 525 may be an example of aspects of the core network 130 described with reference to FIG. 1, or aspects of the SGW 355 and PGW 360 described with reference to FIG. 3.

The UE 515 may implement an IP layer, a PDCP layer, a MAC layer, and a PHY layer. The lowest layers (e.g., the MAC layer and PHY layer) may communicate with corresponding layers implemented by the WLAN access point 535 over a WLAN interface (e.g., an IEEE 802.11 interface). The PDCP layer may communicate with a corresponding layer implemented by the base station 505. The IP layer may communicate with a corresponding layer implemented by the SGW/PGW 525. The WLAN access point 535 may further implement a GTP-U/UDP layer, an IP layer, an L2 layer, and an L1 layer, which layers may communicate with corresponding layers implemented by the base station 505 over an X3 interface. The base station 505 may further implement a GTP—U layer, a UDP layer, an IP layer, an L2 layer, and an L1 layer, which may communicate with corresponding layers implemented by the SGW/PGW 525 over an S5 interface.

By way of example, the WLAN access point 535 may not be collocated with the base station 505. In the illustrated example, the WLAN access point 535 is in communication with the base station 505 over an Xw interface, which may also be called an X3 interface. In some examples, the Xw interface may have a corresponding direct physical link. However, the Xw interface may also be a logical link carried via other network entities (e.g., via one or more gateways in EPC 365 of FIG. 3, etc.). The Xw interface may be terminated at the WLAN access point 535 by a WLAN termination (WT) node, which may include functionality associated with the IP and GTP-U/UDP layers of communication between the WLAN access point 535 and base station 505. Also by way of example, the base station 505 may aggregate data transmitted by the UE 515 over a logical traffic connection including a first data path associated with an LTE/LTE-A RAT and a second data path associated with a Wi-Fi RAT. By way of example, the base station 505 may aggregate data transmitted by the UE 515 over the logical traffic connection at the PDCP layer. Alternatively, the data transmitted by the UE 515 over the logical traffic connection could be aggregated at the RLC layer.

Figure 6:
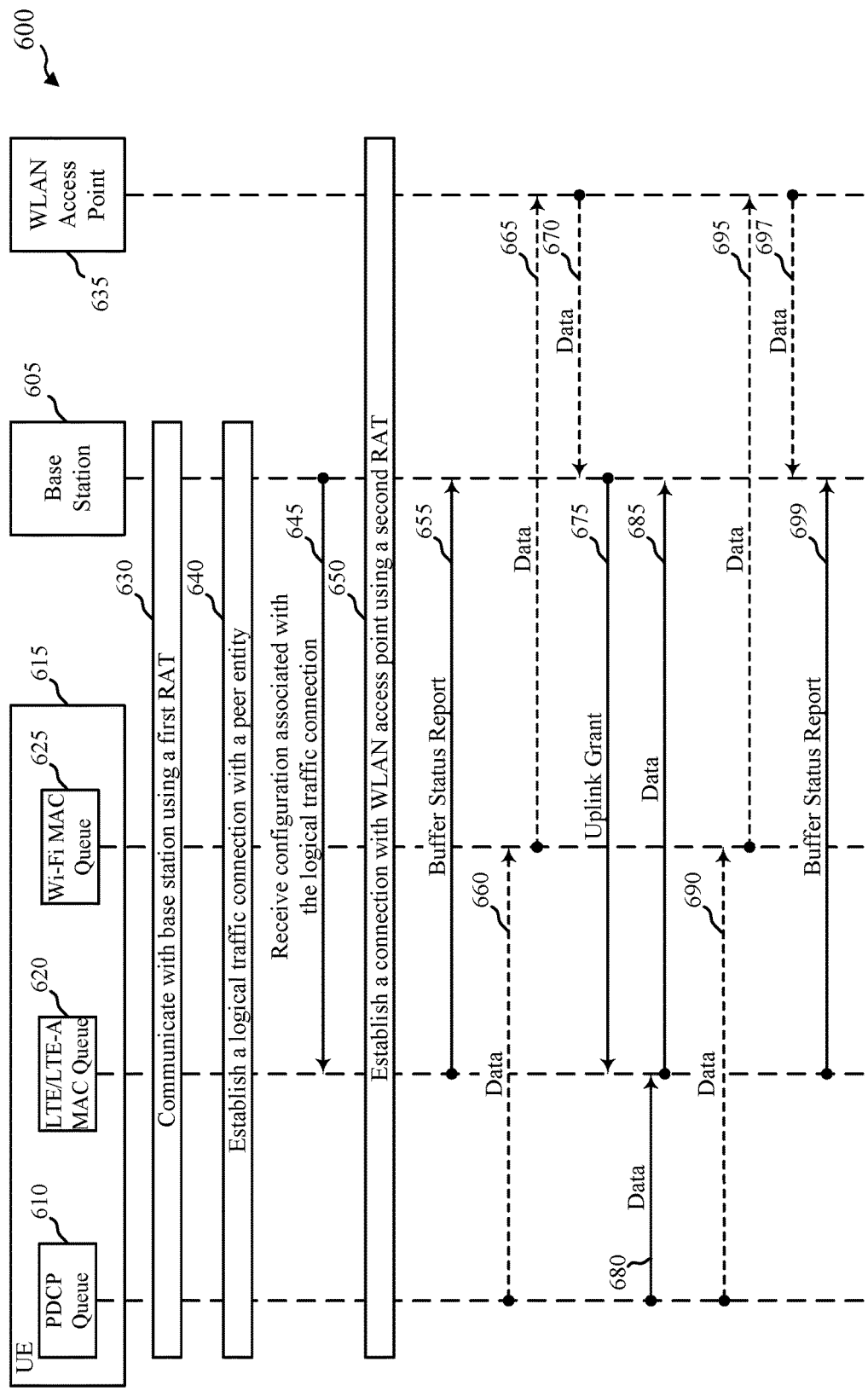
FIG. 6 shows a message flow in which a UE communicates with a base station and a WLAN access point to transmit data over a logical traffic connection between the UE and a peer entity, in accordance with various aspects of the present disclosure.

FIG. 6 shows a message flow 600 in which a UE 615 communicates with a base station 605 and a WLAN access point 635 to transmit data over a logical traffic connection between the UE 615 and a peer entity, in accordance with various aspects of the present disclosure. As shown, the UE 615 may include a PDCP Queue 610, an LTE/LTE-A MAC queue 620, and a Wi-Fi MAC queue 625. Data may be transferred between the queues indirectly, via other layers, or in some examples directly. By way of example, the UE 615 may be an example of aspects of one or more of the UEs 115, 215, 315, 415, or 515 described with reference to FIG. 1, 2, 3, 4, or 5. The base station 605 may be an example of aspects of one or more of the base stations 105, 205, 305, 405, or 505 described with reference to FIG. 1, 2, 3, 4, or 5. The WLAN access point 635 may be an example of aspects of one or more of the WLAN access points 135, 235, 335, or 535 described with reference to FIG. 1, 2, 3, or 5. In some examples, the UE 615, base station 605, and WLAN access point 635 may communicate with one another as described with reference to FIG. 2, 3, 4, or 5 (with the WLAN access point 635 being collocated with, or part of, the base station 605 in the case of FIG. 4).

At 630, the UE 615 may communicate with the base station 605 using an LTE/LTE-A RAT. At 640, the UE 615 may establish a logical traffic connection with a peer entity (e.g., an application server, a content server, a second UE, etc.) via the base station 605.

At 645, the UE 615 may receive, from the base station 605, a configuration associated with the logical traffic connection. The configuration may include parameter(s) for communicating data associated with the logical traffic connection via the WLAN access point 635 using a Wi-Fi RAT. In some examples, the parameter(s) may include at least one of a ratio of data to be transmitted via the WLAN access point 635 and the total amount of data buffered in the PDCP queue 610 associated with the logical traffic connection (e.g., a split ratio indicating how much of the data buffered in the PDCP queue 610 is to be (or may be) transmitted via the WLAN access point 635, or how much of the data buffered in the PDCP queue 610 is to be transmitted via the base station 605), a maximum data limit for communicating the data associated with the logical traffic connection via the WLAN access point (e.g., an upper limit on WLAN transmissions which effectively controls the maximum WLAN throughput), a minimum data threshold for communicating the data associated with the logical traffic connection via the WLAN access point (e.g., a threshold which may cause the UE 615 to refrain from reporting data in a SR/BSR when the threshold is not met), a network identifier of the second access point, or a set of tokens for communicating data associated with the logical traffic connection via the second access point (e.g., a number of tokens which may be removed from a bucket of tokens in proportion to an amount of data pushed to the Wi-Fi MAC queue 625 or transmitted via the second access point). The ratio of data to be transmitted via the WLAN access point 635 may in some cases be determined by the base station 605 dynamically, based on WLAN channel quality and load. The ratio of data to be transmitted via the WLAN access point 635 (or split ratio) may in some cases provide the base station 605 with more precise control over UE transmissions via the WLAN access point 635, but at a cost of having to manage the ratio closely, based on changes in WLAN channel quality and load. The maximum data limit for communicating the data associated with the logical traffic connection via the WLAN access point may in some cases be determined by the base station 605 based on a capability or resource availability of the base station 605 (e.g., set lower when the available resources of the base station 605 may not be sufficient to handle a large amount of data arriving from the WLAN access point 635 at an indeterminate time or without prior knowledge of the base station 605 (unlike data received based on an explicit LTE/LTE-A uplink grant, at a known time). The minimum data threshold for communicating the data associated with the logical traffic connection via the WLAN access point may in some cases be determined by the base station 605 based on a channel load of the WLAN access point 635 (e.g., set lower when throughput via the WLAN access point is low and potentially delaying traffic flow over the logical traffic connection).

At 650, after receiving the configuration at 645, the UE 615 may establish a connection with the WLAN access point 635 using the Wi-Fi RAT. The connection with the WLAN access point 635 may be based at least in part on the parameter(s) for communicating data associated with the logical traffic connection via the WLAN access point 635. For example, the parameter(s) received at 645 may include a network identifier of the WLAN access point 635 (e.g., service set identifier (SSID), etc.), a set of tokens for communicating data associated with the logical traffic connection via the second access point, or an authentication key associated with the WLAN access point 635 (e.g., SSID password, shared key, wired equivalent privacy (WEP) key, etc.), and the UE 615 may use the parameter(s) to identify and connect to the WLAN access point 635. In some examples, the connection to the WLAN access point 635 is established by the UE 615 autonomously (e.g., without input from a user of the UE 615).

At 655, the UE 615 may transmit a BSR including a buffer reporting value to the base station 605. The buffer reporting value may be determined, by the UE 615, based at least in part on a total amount of data buffered in the PDCP queue 610 (and associated with the logical traffic connection), and based at least in part on the parameter(s) for communicating data associated with the logical traffic connection via the WLAN access point 635. In some examples, the UE 615 may estimate a subset of the total amount of data expected to be transmitted via the WLAN access point 635, and may determine the buffer reporting value based at least in part on the subset of the total amount of data. In some examples, the subset of the total amount of data may be estimated for a time period ending at an expected time of receipt of an uplink grant from the first access point. The expected time of receipt of an uplink grant from the first access point may be calculated based at least in part on a minimum time for receiving the uplink grant, a minimum delay from receipt of the grant to an uplink transmission, a semi-persistent grant configuration, or an empirically determined grant delay. In some examples, the subset of the total amount of data may be estimated based at least in part on an estimated data rate associated with communicating with the second access point using the second RAT, a minimum data size associated with communicating with the second access point using the second RAT, a maximum data size associated with communicating with the second access point using the second RAT, a history of uplink transmission scheduling by the first access point, or combinations thereof.

In some examples, the UE 615 may determine the buffer reporting value based on a combination of parameters received from the base station 605 at 645. For example, the buffer reporting value may be set to "0" (e.g., no BSR sent at 655) regardless of there being data available in the PDCP queue associated with the logical traffic connection, when the total amount of data available in the PDCP queue is less than or equal to a minimum data threshold for communicating data associated with the logical traffic connection via the WLAN access point. Otherwise, the buffer reporting value may be determined as a maximum of 1) the total amount of data available in the PDCP queue, less the amount of data needed to meet the maximum data limit for communicating data associated with the logical traffic connection via the WLAN access point 635, or 2) the total amount of data available in the PDCP queue, multiplied by a ratio (or percentage, or split ratio) of the data to be transmitted via the base station 605.

At 660, the UE 615 may optionally push data from the PDCP queue 610 to the Wi-Fi MAC queue 625 for transmission over the logical traffic connection via the WLAN access point 635. At 665, the data pushed to the Wi-Fi MAC queue 625 may be transmitted to the WLAN access point 635. At 670, the WLAN access point 635 may transmit the data received over the logical traffic connection from the UE 615 to the base station 605.

At 675, the UE 615 may receive an uplink grant for transmitting to the base station 605 using the LTE/LTE-A RAT. The uplink grant may be based at least in part on the buffer reporting value included in the BSR transmitted at 655. At 680, the MAC queue 620 may pull a first subset of the total amount of data buffered in the PDCP queue 610, where the first subset of the total amount of data may be an amount of data that can be carried in a transmission associated with the uplink grant. In some examples, the second subset of the total amount of data may be pushed to the LTE/LTE-A MAC queue 620 at an earlier time than shown in FIG. 6. At 685, the data pushed to LTE/LTE-A MAC queue 620 may be transmitted to the base station 605.

At 690, the PDCP queue 610 may optionally push additional data to the Wi-Fi MAC queue 625 for transmission over the logical traffic connection via the WLAN access point 635. At 695, the data pushed to the Wi-Fi MAC queue 625 may be transmitted to the WLAN access point 635. At 697, the WLAN access point 635 may transmit the data associated with the logical traffic connection received from the UE 615 to the base station 605.

At 699, the UE 615 may transmit a second BSR including a second buffer reporting value to the base station 605. The second buffer reporting value may be determined similarly to the first buffer reporting value and/or based at least in part on the first subset of the total amount of data, the second subset of the total amount of data, an indication of a queue status for the MAC queue associated with the second RAT, an amount of additional data in the PDCP queue since the transmission of the BSR, the at least one parameter, or combinations thereof.

In some examples, the operations performed at 660, 665, 670, 675, 680, 685, 690, 695, 697 or 699 may be performed at different times in relation to other operations of the message flow 600. For example, the pushing of data to the Wi-Fi MAC queue 625 at 660 and/or 690 may occur asynchronously to sending BSRs at 690 and 699. Thus, reception of uplink granny 674 may occur before data transmission 665 to the WLAN access point 635.

In some examples of the message flow 600, data pushed from the PDCP queue 610 to the Wi-Fi MAC queue 625 at 660 and/or 690 may be maintained in the PDCP queue 610 for a period of time. If the UE 615 receives an indication of a transmission error for data pushed to the PDCP queue 610 (e.g., a transmission error for the data transmitted at 665 or 695), the second buffer reporting value (included in the second BSR) may be determined based at least in part on receiving the indication of the transmission error. For example, the second buffer reporting value may be determined considering that the data transmitted to the WLAN access point 635 at 665 or 695 was not received or properly decoded by the WLAN access point 635, or considering that the data transmitted to the WLAN access point 635 at 665 or 695 was not ultimately received by the base station 605 at 670 or 697.

In some examples of the message flow 600, the UE 615 may determine, prior to the data transmission at 665 or 695 (or prior to the push of data at 660 or 690), that a parameter for communication with the WLAN access point 635 using the second RAT fails to satisfy a threshold. In some examples, the parameter for communication with the WLAN access point 635 using the second RAT may include at least one of a time to transmit (e.g., to the WLAN access point 635) using the second RAT or a channel metric associated with the second RAT. In some examples, the threshold may include at least one of a threshold time to transmit (e.g., to the base station 605) using the first RAT, a threshold time to transmit using the second RAT, or a channel metric threshold associated with the second RAT. In some examples, the time to transmit using the second RAT may exceed the threshold time to transmit using the second RAT because of contention to access a channel of a radio frequency spectrum band associated with the second RAT. In these examples, the second buffer reporting value (included in the second BSR) may be determined based at least in part on the determination that the parameter for communication with the second access point using the second RAT fails to satisfy the threshold.

A message flow similar to message flow 600 may be employed when the WLAN access point 635 is collocated with (or even incorporated into) the base station 605.

Although FIGS. 2 through 6 have been described in the context of LWA, it will be understood by those having ordinary skill in the art that the concepts described in these Figures may be applied in other contexts, e.g., in a dual-connectivity context between a first base station using a first WWAN technology and a second base station using a second WWAN technology.

Figure 7:
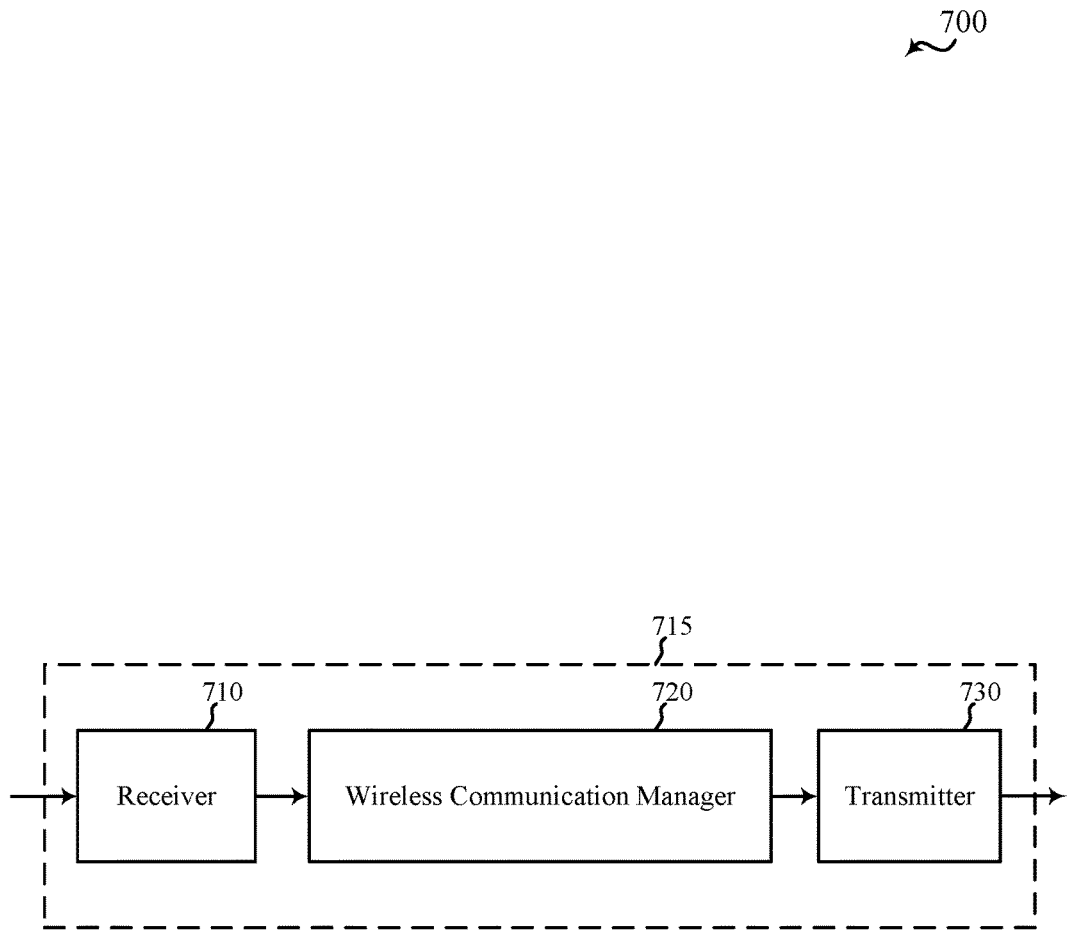
FIG. 7 shows a block diagram of an apparatus for wireless communication at a UE, in accordance with various aspects of the present disclosure.

FIG. 7 shows a block diagram 700 of an apparatus 715 for wireless communication at a UE, in accordance with various aspects of the present disclosure. The apparatus 715 may be an example of aspects of one or more of the UEs 115, 215, 315, 415, 515, or 615 described with reference to FIG. 1, 2, 3, 4, 5, or 6. The apparatus 715 may include a receiver 710, a wireless communication manager 720, and a transmitter 730. The apparatus 715 may also include a processor. Each of these components may be in communication with each other.

The receiver 710 may receive information such as packets, user data, or control information associated with various information channels (e.g., control channels, data channels, information related to connecting to a first access point (e.g., a base station or eNB) or a second access point (e.g., a WLAN access point or a different WWAN access point), or information related to configuring a logical traffic connection associated with the first access point and the second access point, etc.). Received information may be passed to other components of the apparatus 715, including the wireless communication manager 720. The receiver 710 may be an example of aspects of the UE transceiver(s) 1030 described with reference to FIG. 10. The receiver 710 may include or be associated with a single antenna or a plurality of antennas.

The wireless communication manager 720 may be used to manage one or more aspects of wireless communication for the apparatus 715. In some examples, part of the wireless communication manager 720 may be incorporated into or shared with the receiver 710 or the transmitter 730. In some examples, the wireless communication manager 720 may be used to manage a logical traffic connection associated with a first access point and a second access point. The apparatus 715 may communicate with the first access point using a first RAT and communicate with the second access point using a second RAT. In some examples, the first RAT may include a WWAN technology (e.g., LTE/LTE-A) and the second RAT may include a WLAN technology (e.g., Wi-Fi) or a different WWAN technology (e.g., 3G or NR).

The transmitter 730 may transmit signals received from other components of the apparatus 715, including the wireless communication manager 720. In some examples, the transmitter 730 may be collocated with the receiver 710 in a transceiver. The transmitter 730 may be an example of aspects of the UE transceiver(s) 1030 described with reference to FIG. 10. The transmitter 730 may include or be associated with a single antenna or a plurality of antennas.

Figure 8:
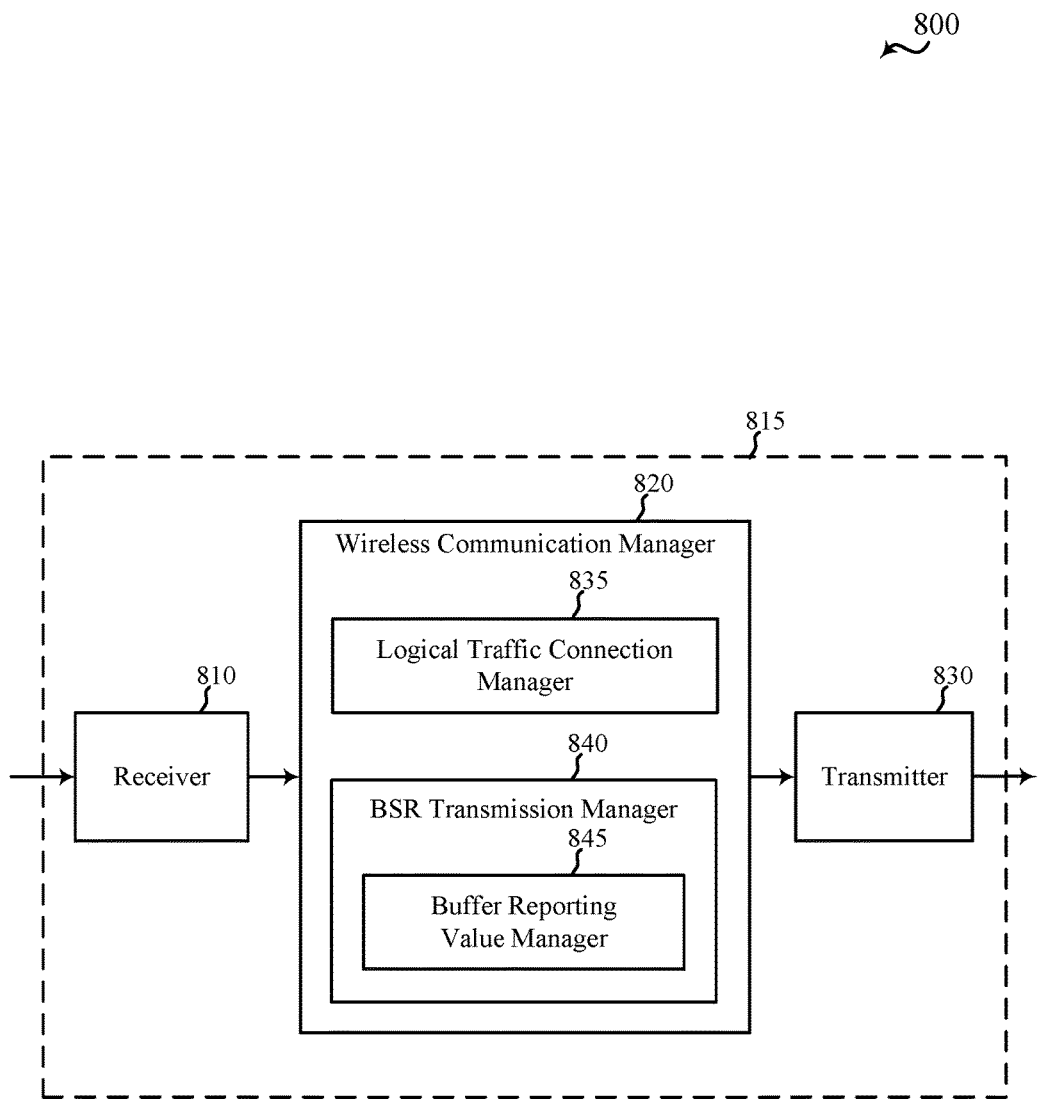
FIG. 8 shows a block diagram of an apparatus for wireless communication at a UE, in accordance with various aspects of the present disclosure.

FIG. 8 shows a block diagram 800 of an apparatus 815 for wireless communication at a UE, in accordance with various aspects of the present disclosure. The apparatus 815 may be an example of aspects of one or more of the UEs 115, 215, 315, 415, 515, or 615 described with reference to FIG. 1, 2, 3, 4, 5, or 6, or aspects of the apparatus 715 described with reference to FIG. 7. The apparatus 815 may include a receiver 810, a wireless communication manager 820, and a transmitter 830. The apparatus 815 may also include a processor. Each of these components may be in communication with each other.

The receiver 810 may receive information that may be passed to other components of the apparatus 815, including the wireless communication manager 820. The receiver 810 may also perform the functions described with reference to the receiver 710 described with reference to FIG. 7. The receiver 810 may be an example of aspects of the UE transceiver(s) 1030 described with reference to FIG. 10. The receiver 810 may include or be associated with a single antenna or a plurality of antennas.

The wireless communication manager 820 may be an example of aspects of the wireless communication manager 720 described with reference to FIG. 7 or the UE wireless communication manager 1050 described with reference to FIG. 10. The wireless communication manager 820 may communicate with a first access point using a first RAT or a second access point using a second RAT. In some examples, the first RAT may include a WWAN technology (e.g., LTE/LTE-A) and the second RAT may include a WLAN technology (e.g., Wi-Fi). In some other examples, the first RAT may include a first WWAN technology (e.g., LTE/LTE-A) and the second RAT may include a second WWAN technology (e.g., 3G or NR). In some examples, the first access point may facilitate a logical traffic connection associated with the first access point and the second access point by performing LTE/Wi-Fi aggregation (e.g., in an LWA mode). The wireless communication manager 820 may include a logical traffic connection manager 835 or a BSR transmission manager 840. The BSR transmission manager 840 may further include a buffer reporting value manager 845.

The logical traffic connection manager 835 may be used to establish a logical traffic connection via the first access point. The logical traffic connection manager 835 may also be used to receive, from the first access point, a configuration associated with the logical traffic connection. The configuration may include at least one parameter for communicating data associated with the logical traffic connection via the second access point using the second RAT. In some examples, the at least one parameter may include at least one of a ratio of data to be transmitted via the second access point and a total amount of data buffered in a PDCP queue associated with the logical traffic connection, a maximum data limit for communicating the data associated with the logical traffic connection via the second access point, a minimum data threshold for communicating the data associated with the logical traffic connection via the second access point, a network identifier of the second access point, or a set of tokens for communicating data associated with the logical traffic connection via the second access point.

The buffer reporting value manager 845 may be used to determine a buffer reporting value associated with the logical traffic connection based at least in part on the total amount of data buffered in the PDCP queue associated with the logical traffic connection and the at least one parameter received by the logical traffic connection manager 835.

The BSR transmission manager 840 may be used to transmit a BSR including the buffer reporting value to the first access point.

The transmitter 830 may transmit signals received from other components of the apparatus 815, including the wireless communication manager 820. The transmitter 830 may also perform the functions described with reference to the transmitter 730 described with reference to FIG. 7. In some examples, the transmitter 830 may be collocated with the receiver 810 in a transceiver module. The transmitter 830 may be an example of aspects of the UE transceiver(s) 1030 described with reference to FIG. 10. The transmitter 830 may include or be associated with a single antenna or a plurality of antennas.

Figure 9:
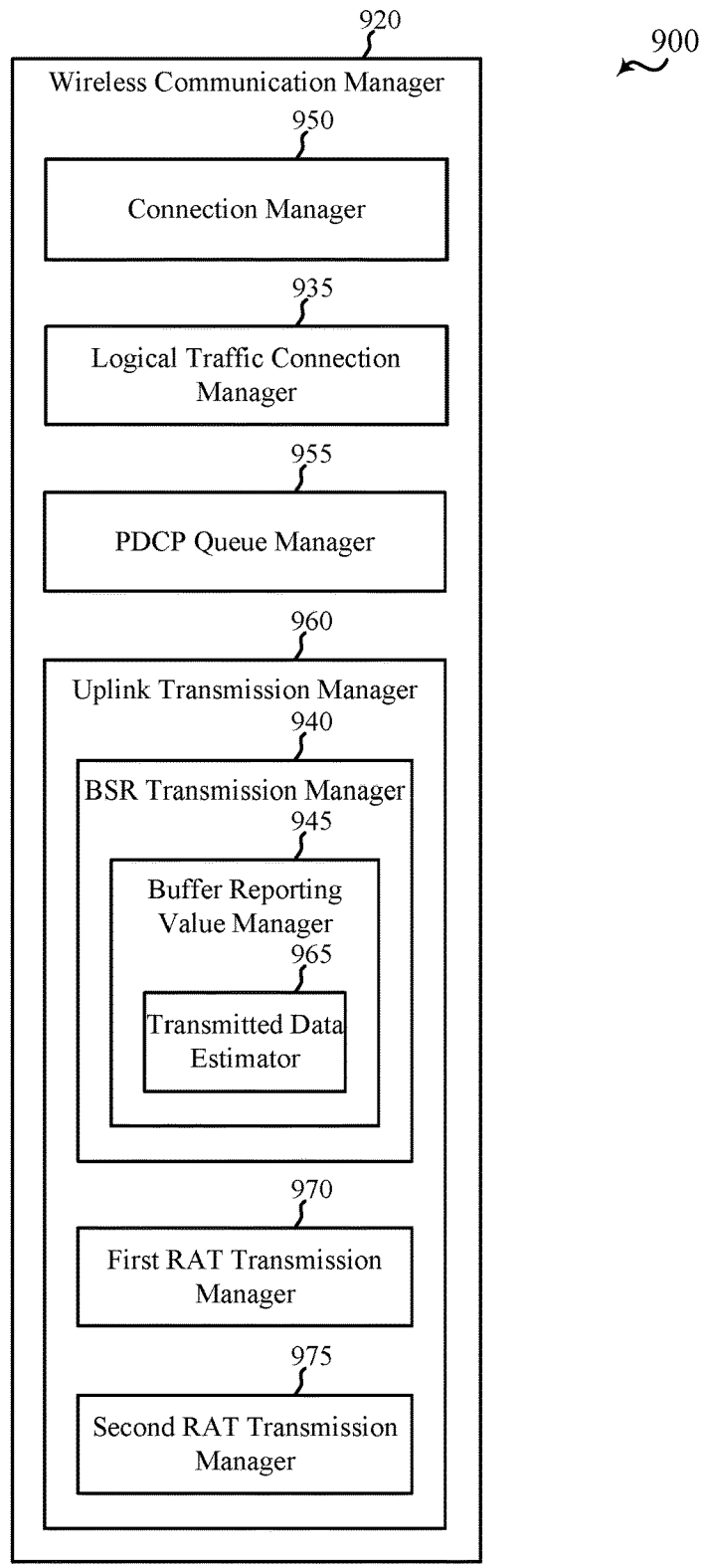
FIG. 9 shows a block diagram of a wireless communication manager, in accordance with various aspects of the present disclosure.

FIG. 9 shows a block diagram 900 of a wireless communication manager 920, in accordance with various aspects of the present disclosure. The wireless communication manager 920 may be an example of aspects of the wireless communication manager 720 or 820 described with reference to FIG. 7 or 8, or the UE wireless communication manager 1050 described with reference to FIG. 10.

The wireless communication manager 920 may include a connection manager 950, a logical traffic connection manager 935, a PDCP queue manager 955, or an uplink transmission manager 960. The uplink transmission manager 960 may further include a BSR transmission manager 940, a first RAT transmission manager 970, or a second RAT transmission manager 975. The BSR transmission manager 940 may include a buffer reporting value manager 945, which may include a transmitted data estimator 965. Each of these components may communicate, directly or indirectly, with one another (e.g., via one or more buses). The logical traffic connection manager 935, BSR transmission manager 940, and buffer reporting value manager 945 may be respective examples of the logical traffic connection manager 835, the BSR transmission manager 840, and the buffer reporting value manager 845 described with reference to FIG. 8. The wireless communication manager 920 may communicate with a first access point using a first RAT or a second access point using a second RAT. In some examples, the first RAT may include a WWAN technology (e.g., LTE/LTE-A) and the second RAT may include a WLAN technology (e.g., Wi-Fi). In some other examples, the first RAT and the second RAT may be different WWAN technologies (e.g., 3G, 4G, or 5G). In some examples, the first access point may facilitate a logical traffic connection associated with the first access point and the second access point by performing LTE/Wi-Fi aggregation (e.g., in an LWA mode).

The transmitted data estimator 965 may be used to estimate a subset of the total amount of data buffered in the PDCP queue associated with a logical traffic connection, which subset of the total amount of data is expected to be transmitted via the second access point. In some examples, the subset of the total amount of data may be estimated for a time period ending at an expected time of receipt of an uplink grant from the first access point. In some examples, the subset of the total amount of data may be estimated based at least in part on an estimated data rate associated with communicating with the second access point using the second RAT, a minimum data size associated with communicating with the second access point using the second RAT, a maximum data size associated with communicating with the second access point using the second RAT, a history of uplink transmission scheduling by the first access point, or combinations thereof. In some examples, the buffer reporting value manager 945 may determine a buffer reporting value based at least in part on the subset of the total amount of data estimated by the transmitted data estimator 965.

The first RAT transmission manager 970 may be used to receive an uplink grant for transmitting to the first access point using the first RAT. The uplink grant may be based at least in part on a buffer reporting value included in a BSR transmitted by the BSR transmission manager 940. The PDCP queue manager 955 may be used to push a first subset of the total amount of data buffered in a PDCP queue associated with a logical traffic connection to a MAC queue associated with the first RAT, in accordance with the received uplink grant. The first RAT transmission manager 970 may also be used to transmit the first subset of the total amount of data to the first access point using the first RAT, in accordance with the received uplink grant.

The PDCP queue manager 955 may also be used to push a second subset of the total amount of data buffered in the PDCP queue associated with the logical traffic connection to a MAC queue associated with the second RAT. The second RAT transmission manager 975 may be used to transmit the second subset of the total amount of data to the second access point using the second RAT.

Data may be pushed from the PDCP queue associated with the logical traffic connection, to the MAC queue associated with the first RAT or the MAC queue associated with the second RAT, sequentially or simultaneously, in various orders, and synchronously or asynchronously. In some examples, data pushed from the PDCP queue to the MAC queue associated with the second RAT may be maintained in the PDCP queue for a period of time (e.g., to ensure that the data is successfully transmitted, or to ensure that the data is successfully aggregated with other data transmitted to the first access point).

In some examples, the buffer reporting value manager 945 may be used to determine a second buffer reporting value based at least in part on the second subset of the total amount of data and based at least in part on receiving an indication of a transmission error for the second subset of the total amount of data using the second RAT. In some examples, the transmission error may pertain to receipt of a non-acknowledgement (or non-receipt of an acknowledgement) of a transmission of the second subset of the total amount of data. In other examples, the buffer reporting value manager 945 may be used to determine a second buffer reporting value based at least in part on the first subset of the total amount of data, the second subset of the total amount of data, an indication of a queue status for the MAC queue associated with the second RAT, an amount of additional data in the PDCP queue since the transmission of the BSR, at least one parameter received by the logical traffic connection manager 935, or combinations thereof. In either set of examples, the BSR transmission manager 940 may be used to transmit a second BSR including the second buffer reporting value to the first access point.

In some examples, the second RAT transmission manager 975 may be used to determine that a parameter for communication with the second access point using the second RAT fails to satisfy a threshold. In some examples, the parameter for communication with the second access point using the second RAT may include at least one of a time to transmit (e.g., to the second access point) using the second RAT or a channel metric associated with the second RAT. In some examples, the threshold may include at least one of a time to transmit (e.g., to the first access point) using the first RAT, a threshold time to transmit using the second RAT, or a channel metric threshold associated with the second RAT. In some examples, the time to transmit using the second RAT may exceed one or both of the time to transmit using the first RAT or the threshold time to transmit using the second RAT because of contention to access a channel of a radio frequency spectrum band associated with the second RAT. In some examples, the buffer reporting value manager 945 may be used to determine a second buffer reporting value based at least in part on the determination that the parameter for communication with the second access point using the second RAT fails to satisfy the threshold, and the BSR transmission manager 940 may be used to transmit a second BSR including the second buffer reporting value to the first access point.

Figure 10:
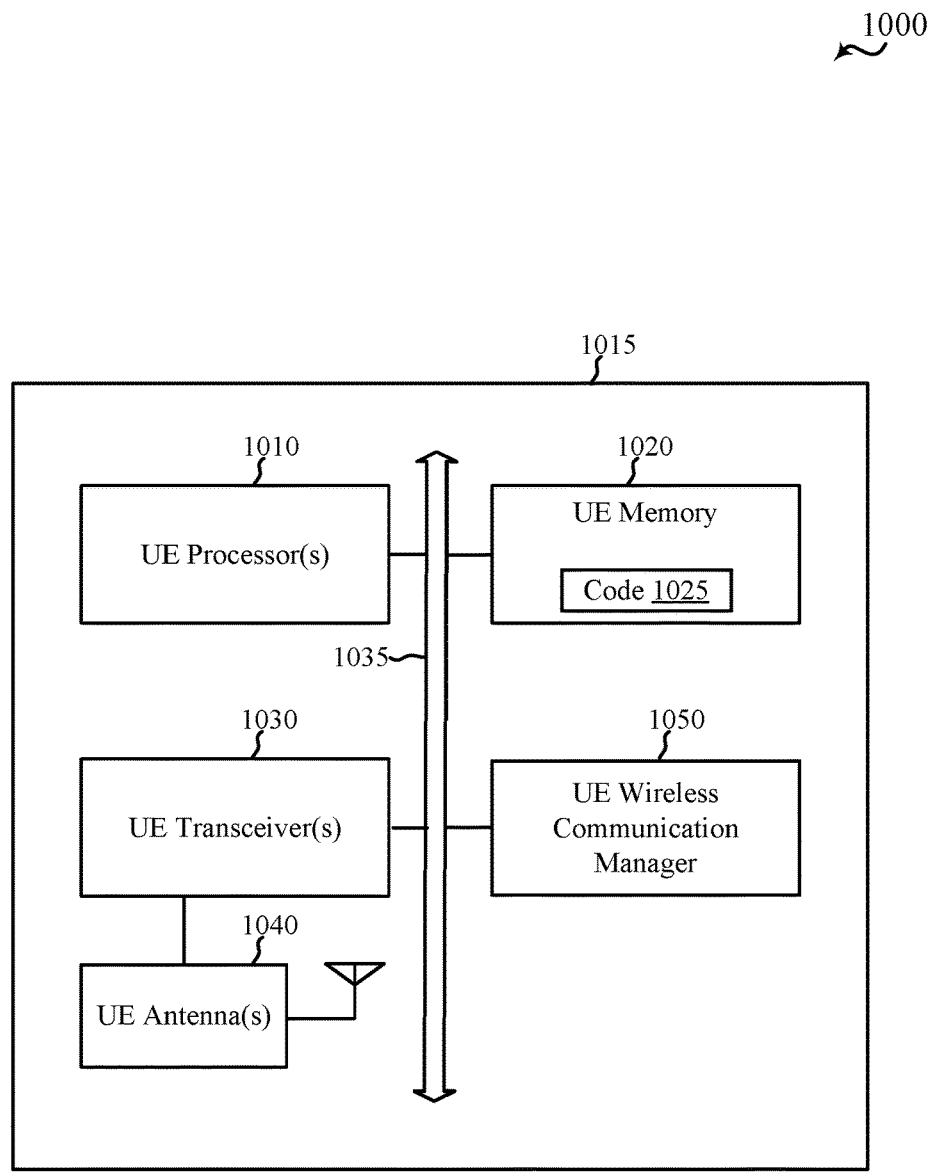
FIG. 10 shows a block diagram of a UE for use in wireless communication, in accordance with various aspects of the present disclosure.

FIG. 10 shows a block diagram 1000 of a UE 1015 for use in wireless communication, in accordance with various aspects of the present disclosure. The UE 1015 may be include or be part of a personal computer (e.g., a laptop computer, a netbook computer, a tablet computer, etc.), a cellular telephone, a smart phone, a PDA, a DVR, an internet appliance, a gaming console, an e-reader, etc. The UE 1015 may, in some examples, have an internal power supply (not shown), such as a small battery, to facilitate mobile operation. In some examples, the UE 1015 may be an example of aspects of one or more of the UEs 115, 215, 315, 415, 515, or 615 described with reference to FIG. 1, 2, 3, 4, 5, or 6, or aspects of one or more of the apparatuses 715 or 815 described with reference to FIG. 7 or 8. The UE 1015 may be configured to implement at least some of the UE or apparatus techniques and functions described with reference to other figures.

The UE 1015 may include at least one processor (represented by UE processor(s) 1010), a UE memory 1020, at least one UE transceiver (represented by UE transceiver(s) 1030), at least one antenna (represented by UE antenna(s) 1040), or a UE wireless communication manager 1050. Each of these components may be in communication with each other, directly or indirectly, over one or more buses 1035.

The UE memory 1020 may include random access memory (RAM) or read-only memory (ROM). The UE memory 1020 may store computer-readable, computer-executable code 1025 containing instructions that are configured to, when executed, cause the UE processor(s) 1010 to perform various functions described herein related to wireless communication, such as the transmission and reception of data and control information over a logical traffic connection. The logical traffic connection may be associated with a first access point associated with a first RAT, and with a second access point associated with a second RAT. Alternatively, the computer-executable code 1025 may not be directly executable by the UE processor(s) 1010 but be configured to cause the UE 1015 (e.g., when compiled and executed) to perform various of the functions described herein.

The UE processor(s) 1010 may include one or more intelligent hardware devices, e.g., a central processing unit (CPU), a microcontroller, an ASIC, etc. The UE processor(s) 1010 may process information received through the UE transceiver(s) 1030 or information to be sent to the UE transceiver(s) 1030 for transmission through the UE antenna(s) 1040. The UE processor(s) 1010 may handle, alone or in connection with the UE wireless communication manager 1050, various aspects of communicating over (or managing communications over) a logical traffic connection, including, for example, communicating with a first access point associated with a first RAT and communicating with a second access point associated with a second RAT. In some examples, the first RAT may be a WWAN technology (e.g., LTE/LTE-A) and the second RAT may be a WLAN technology (e.g., Wi-Fi). In some other examples, the first RAT may be a first WWAN technology (e.g., LTE/LTE-A) and the second RAT may be a second WWAN technology (e.g., 3G or NR).

The UE transceiver(s) 1030 may be configured to modulate packets and provide the modulated packets to the UE antenna(s) 1040 for transmission. The UE transceiver(s) 1030 may also demodulate packets received from the UE antenna(s) 1040. The UE transceiver(s) 1030 may, in some examples, be implemented as one or more UE transmitters and one or more separate UE receivers. The UE transceiver(s) 1030 may be configured to communicate bi-directionally, via the UE antenna(s) 1040, with one or more access points (e.g., eNBs, base stations, or WLAN access points). While the UE 1015 may include a single antenna, there may be examples in which the UE 1015 may include multiple antennas.

The UE wireless communication manager 1050 may be configured to coordinate or manage LWA communications for the UE 1015. The UE wireless communication manager 1050, or portions of it, may include a processor, or some or all of the functions of the UE wireless communication manager 1050 may be performed by one or more of the UE processor(s) 1010 or in connection with the UE processor(s) 1010. In some examples, the UE wireless communication manager 1050 may be an example of the wireless communication manager 720, 820, or 920 described with reference to FIG. 7, 8, or 9.

Figure 11:
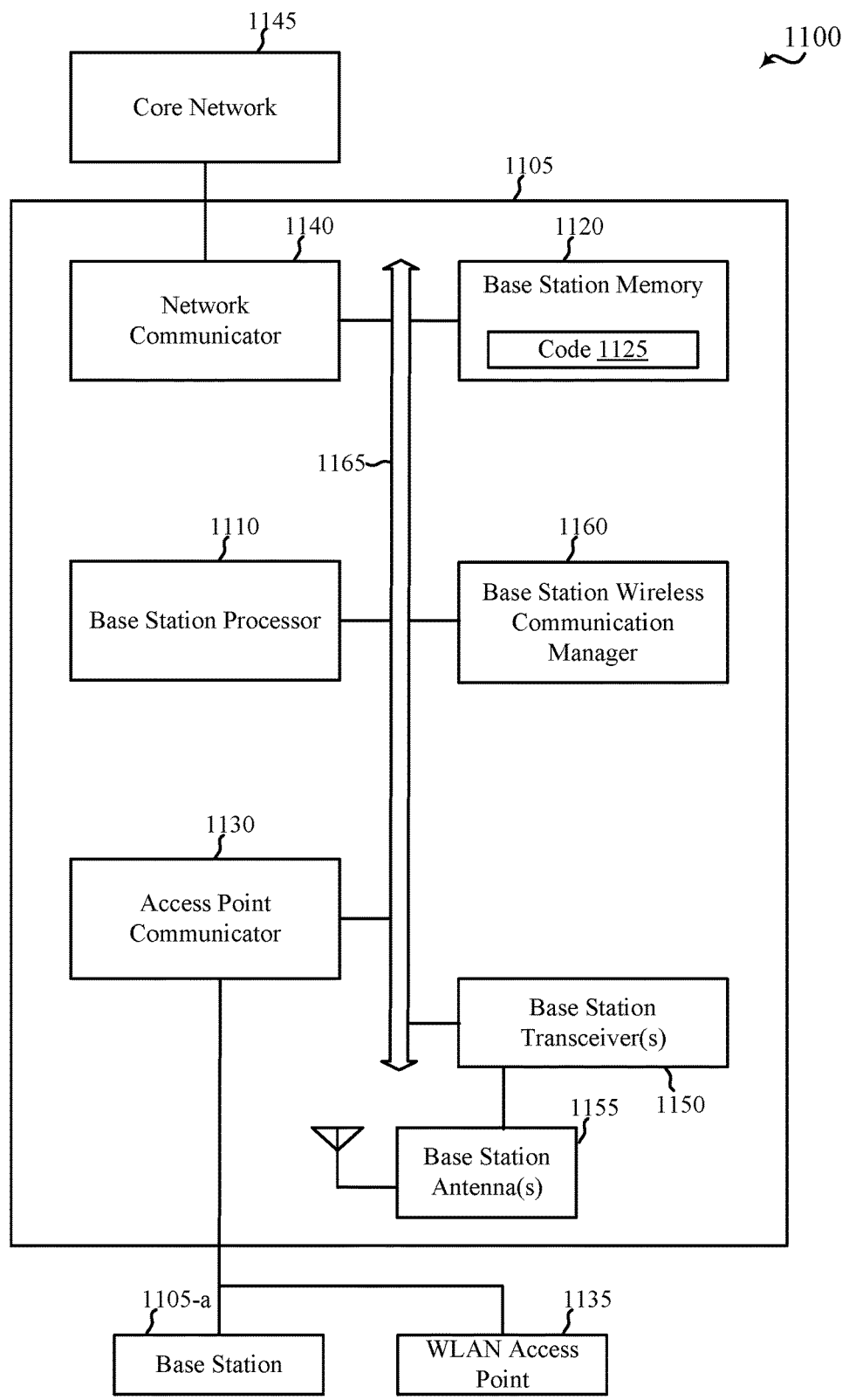
FIG. 11 shows a block diagram of a base station (e.g., a base station forming part or all of an eNB) for use in wireless communication, in accordance with various aspects of the present disclosure.

FIG. 11 shows a block diagram 1100 of a base station 1105 (e.g., a base station forming part or all of an eNB) for use in wireless communication, in accordance with various aspects of the present disclosure. In some examples, the base station 1105 may be an example of aspects of one or more of the base stations 105, 205, 305, 405, 505, or 605 described with reference to FIG. 1, 2, 3, 4, 5, or 6. The base station 1105 may be configured to implement or facilitate at least some of the base station techniques and functions described with reference to other figures.

The base station 1105 may include a base station processor 1110, a base station memory 1120, at least one base station transceiver (represented by base station transceiver(s) 1150), at least one base station antenna (represented by base station antenna(s) 1155), or a base station wireless communication manager 1160. The base station 1105 may also include one or more of an access point communicator 1130 or a network communicator 1140. Each of these components may be in communication with each other, directly or indirectly, over one or more buses 1165.

The base station memory 1120 may include RAM or ROM. The base station memory 1120 may store computer-readable, computer-executable code 1125 containing instructions that are configured to, when executed, cause the base station processor 1110 to perform various functions described herein related to wireless communication, such as the transmission and reception of data and control information over a logical traffic connection. The logical traffic connection may be associated with the base station, using a first RAT, and with a WLAN access point 1135 associated with a second RAT. Alternatively, the computer-executable code 1125 may not be directly executable by the base station processor 1110 but be configured to cause the base station 1105 (e.g., when compiled and executed) to perform various of the functions described herein.

The base station processor 1110 may include an intelligent hardware device, e.g., a CPU, a microcontroller, an ASIC, etc. The base station processor 1110 may process information received through the base station transceiver(s) 1150, the access point communicator 1130, or the network communicator 1140. The base station processor 1110 may also process information to be sent to the transceiver(s) 1150 for transmission through the antenna(s) 1155, to the access point communicator 1130, for transmission to one or more other access points (e.g., base station 1105-*a* or WLAN access point 1135), or to the network communicator 1140 for transmission to a core network 1145, which may be an example of one or more aspects of the core network 130 described with reference to FIG. 1. The base station processor 1110 may handle, alone or in connection with the base station wireless communication manager 1160, various aspects of communicating over (or managing communications over) a logical traffic connection, including, for example, communicating with a UE using a first RAT (e.g., a WWAN technology, such as LTE/LTE-A) and communicating with the WLAN access point. The WLAN access point may communicate with the UE using a second RAT (e.g., a WLAN technology, such as Wi-Fi). In some examples, the WLAN access point may be non-collocated with the base station 1105. In other examples, the WLAN access point may be collocated with the base station 1105, and in some examples may be provided in whole or in part by an ASIC associated with the base station 1105.

The base station transceiver(s) 1150 may include a modem configured to modulate packets and provide the modulated packets to the base station antenna(s) 1155 for transmission, and to demodulate packets received from the base station antenna(s) 1155. The base station transceiver(s) 1150 may, in some examples, be implemented as one or more base station transmitters and one or more separate base station receivers. The base station transceiver(s) 1150 may be configured to communicate bi-directionally, via the antenna(s) 1155, with one or more UEs or apparatuses, such as one or more of the UEs 115, 215, 315, 415, 515, 615, or 1015 described with reference to FIG. 1, 2, 3, 4, 5, 6, or 19, or one or more of the apparatuses 715 or 815 described with reference to FIG. 7 or 8. The base station 1105 may, for example, include multiple base station antennas 1155 (e.g., an antenna array). The base station 1105 may communicate with the core network 1145 through the network communicator 1140. The base station 1105 may also communicate with other access points, such as the base station 1105-*a* and the WLAN access point 1135, using the access point communicator 1130.

The base station wireless communication manager 1160 may be configured to perform or control some or all of the techniques or functions described with reference to other figures. The base station wireless communication manager 1160, or portions of it, may include a processor, or some or all of the functions of the base station wireless communication manager 1160 may be performed by the base station processor 1110 or in connection with the base station processor 1110. In some examples, the base station wireless communication manager 1160 may facilitate a logical traffic connection between a UE and a peer entity by performing LTE/Wi-Fi aggregation (e.g., in an LWA mode).

Figure 12:
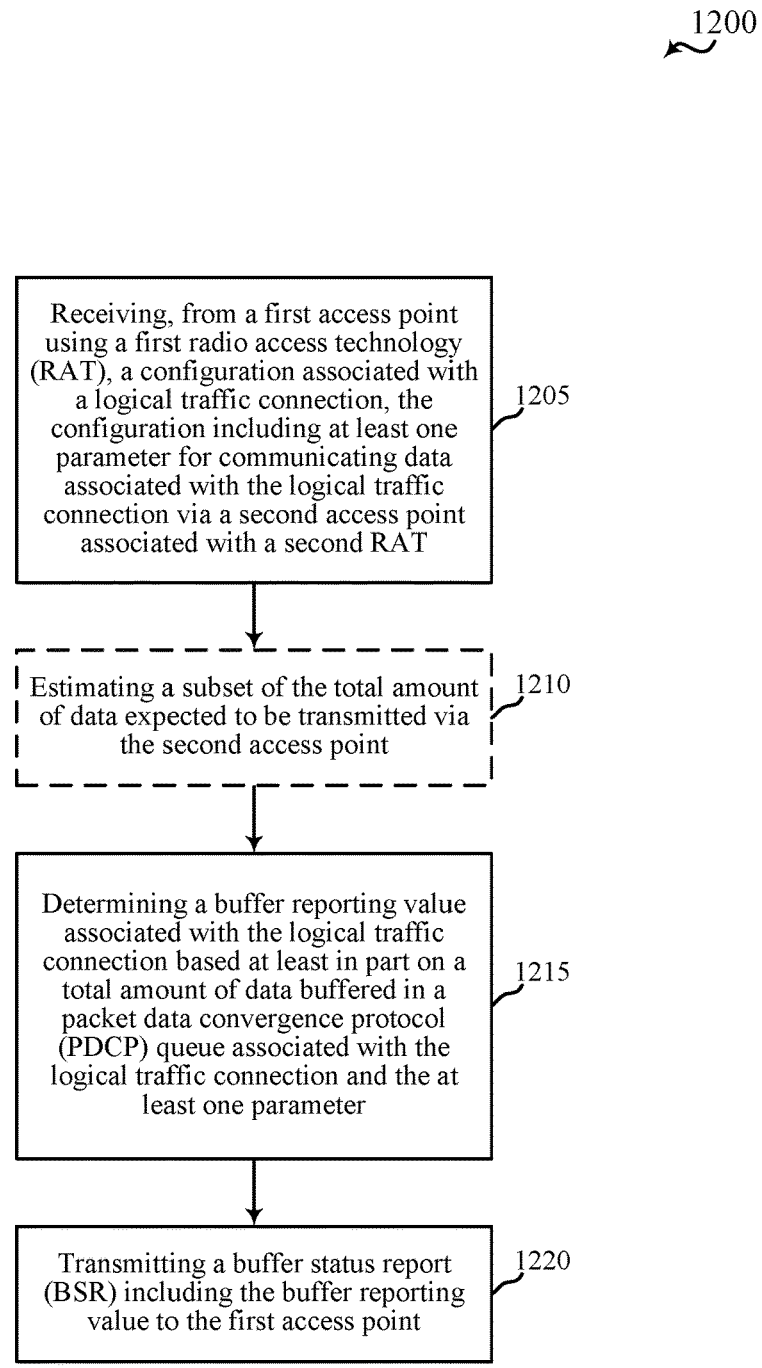
FIG. 12 is a flow chart illustrating an example of a method for wireless communication at a UE, in accordance with various aspects of the present disclosure.

FIG. 12 is a flow chart illustrating an example of a method 1200 for wireless communication at a UE, in accordance with various aspects of the present disclosure. For clarity, the method 1200 is described below with reference to aspects of one or more of the UEs 115, 215, 315, 415, 515, 615, or 1015 described with reference to FIG. 1, 2, 3, 4, 5, 6, or 10, or aspects of one or more of the apparatuses 715 or 815 described with reference to FIG. 7 or 8. In some examples, a UE may execute one or more sets of codes to control the functional elements of the UE to perform the functions described below. Additionally or alternatively, the UE may perform one or more of the functions described below using special-purpose hardware.

At block 1205, the method 1200 may include receiving, from a first access point using a first RAT, a configuration associated with a logical traffic connection. The configuration may include at least one parameter for communicating data associated with the logical traffic connection via a second access point associated with a second RAT. In some examples, the at least one parameter may include at least one of a ratio of data to be transmitted via the second access point and a total amount of data buffered in a PDCP queue associated with the logical traffic connection, a maximum data limit for communicating the data associated with the logical traffic connection via the second access point, a minimum data threshold for communicating the data associated with the logical traffic connection via the second access point, a network identifier of the second access point, or a set of tokens for communicating data associated with the logical traffic connection via the second access point. The operation(s) at block 1205 may be performed using the wireless communication manager 720, 820, or 920 described with reference to FIG. 7, 8, or 9, the UE wireless communication manager 1050 described with reference to FIG. 10, or the logical traffic connection manager 835 or 935 described with reference to FIG. 8 or 9.

At block 1210, the method 1200 may optionally include estimating a subset of the total amount of data buffered in the PDCP queue associated with the logical traffic connection, which subset of the total amount of data is expected to be transmitted via the second access point. In some examples, the subset of the total amount of data may be estimated for a time period ending at an expected time of receipt of an uplink grant from the first access point. In some examples, the subset of the total amount of data may be estimated based at least in part on an estimated data rate associated with communicating with the second access point using the second RAT, a minimum data size associated with communicating with the second access point using the second RAT, a maximum data size associated with communicating with the second access point using the second RAT, a history of uplink transmission scheduling by the first access point, or combinations thereof. The operation(s) at block 1210 may be performed using the wireless communication manager 720, 820, or 920 described with reference to FIG. 7, 8, or 9, the UE wireless communication manager 1050 described with reference to FIG. 10, or the transmitted data estimator 965 described with reference to FIG. 9.

At block 1215, the method 1200 may include determining a buffer reporting value associated with the logical traffic connection based at least in part on the total amount of data buffered in the PDCP queue associated with the logical traffic connection and the at least one parameter received at block 1205. In some examples, determining the buffer reporting value may be based at least in part on the subset of the total amount of data estimated at block 1210. The operation(s) at block 1215 may be performed using the wireless communication manager 720, 820, or 920 described with reference to FIG. 7, 8, or 9, the UE wireless communication manager 1050 described with reference to FIG. 10, or the buffer reporting value manager 845 or 945 described with reference to FIG. 8 or 9.

At block 1220, the method 1200 may include transmitting a BSR including the buffer reporting value to the first access point. The operation(s) at block 1220 may be performed using the wireless communication manager 720, 820, or 920 described with reference to FIG. 7, 8, or 9, the UE wireless communication manager 1050 described with reference to FIG. 10, or the BSR transmission manager 840 or 940 described with reference to FIG. 8 or 9.

In some examples of the method 1200, the first RAT may include a WWAN technology (e.g., LTE/LTE-A) and the second RAT may include a WLAN technology (e.g., Wi-Fi). In some other examples, the first RAT may include a first WWAN technology (e.g., LTE/LTE-A) and the second RAT may include a second WWAN technology (e.g., 3G or NR). In some examples of the method 1200, the first access point may facilitate the logical traffic connection by performing LTE/Wi-Fi aggregation (e.g., in an LWA mode).

Figure 13:
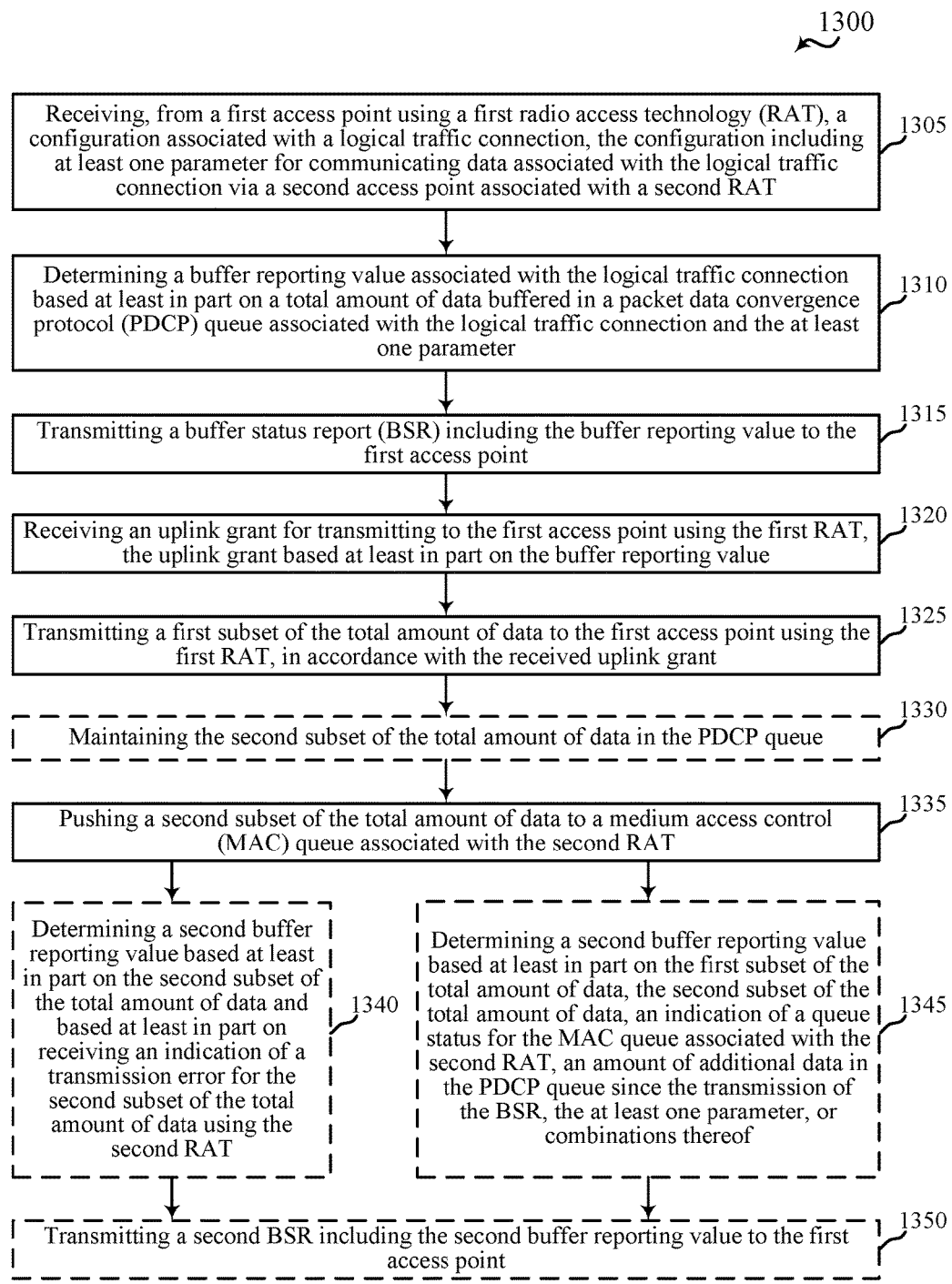
FIG. 13 is a flow chart illustrating an example of a method for wireless communication at a UE, in accordance with various aspects of the present disclosure.

FIG. 13 is a flow chart illustrating an example of a method 1300 for wireless communication at a UE, in accordance with various aspects of the present disclosure. For clarity, the method 1300 is described below with reference to aspects of one or more of the UEs 115, 215, 315, 415, 515, 615, or 1015 described with reference to FIG. 1, 2, 3, 4, 5, 6, or 10, or aspects of one or more of the apparatuses 715 or 815 described with reference to FIG. 7 or 8. In some examples, a UE may execute one or more sets of codes to control the functional elements of the UE to perform the functions described below. Additionally or alternatively, the UE may perform one or more of the functions described below using special-purpose hardware.

At block 1305, the method 1300 may include receiving, from a first access point using a first RAT, a configuration associated with a logical traffic connection. The configuration may include at least one parameter for communicating data associated with the logical traffic connection via a second access point associated with a second RAT. In some examples, the at least one parameter may include at least one of a ratio of data to be transmitted via the second access point and a total amount of data buffered in a PDCP queue associated with the logical traffic connection, a maximum data limit for communicating the data associated with the logical traffic connection via the second access point, a minimum data threshold for communicating the data associated with the logical traffic connection via the second access point, a network identifier of the second access point, or a set of tokens for communicating data associated with the logical traffic connection via the second access point. The operation(s) at block 1305 may be performed using the wireless communication manager 720, 820, or 920 described with reference to FIG. 7, 8, or 9, the UE wireless communication manager 1050 described with reference to FIG. 10, or the logical traffic connection manager 835 or 935 described with reference to FIG. 8 or 9.

At block 1310, the method 1300 may include determining a buffer reporting value associated with the logical traffic connection based at least in part on the total amount of data buffered in the PDCP queue associated with the logical traffic connection and the at least one parameter received at block 1305. The operation(s) at block 1310 may be performed using the wireless communication manager 720, 820, or 920 described with reference to FIG. 7, 8, or 9, the UE wireless communication manager 1050 described with reference to FIG. 10, or the buffer reporting value manager 845 or 945 described with reference to FIG. 8 or 9.

At block 1315, the method 1300 may include transmitting a BSR including the buffer reporting value to the first access point. The operation(s) at block 1315 may be performed using the wireless communication manager 720, 820, or 920 described with reference to FIG. 7, 8, or 9, the UE wireless communication manager 1050 described with reference to FIG. 10, or the BSR transmission manager 840 or 940 described with reference to FIG. 8 or 9.

At block 1320, the method 1300 may include receiving an uplink grant for transmitting to the first access point using the first RAT. The uplink grant may be based at least in part on the buffer reporting value included in the BSR transmitted at block 1315. The operation(s) at block 1320 may be performed using the wireless communication manager 720, 820, or 920 described with reference to FIG. 7, 8, or 9, the UE wireless communication manager 1050 described with reference to FIG. 10, or the first RAT transmission manager 970 described with reference to FIG. 9.

At block 1325, the method 1300 may include transmitting a first subset of the total amount of data to the first access point using the first RAT, in accordance with the received uplink grant. The operation(s) at block 1325 may be performed using the wireless communication manager 720, 820, or 920 described with reference to FIG. 7, 8, or 9, the UE wireless communication manager 1050 described with reference to FIG. 10, or the PDCP queue manager 955 or first RAT transmission manager 970 described with reference to FIG. 9.

At block 1330, the method 1300 may optionally include maintaining a second subset of the total amount of data in the PDCP queue. The operation(s) at block 1330 may be performed using the wireless communication manager 720, 820, or 920 described with reference to FIG. 7, 8, or 9, the UE wireless communication manager 1050 described with reference to FIG. 10, or the PDCP queue manager 955 described with reference to FIG. 9.

At block 1335, the method 1300 may include pushing the second subset of the total amount of data to a MAC queue associated with the second RAT. The operation(s) at block 1335 may be performed using the wireless communication manager 720, 820, or 920 described with reference to FIG. 7, 8, or 9, the UE wireless communication manager 1050 described with reference to FIG. 10, or the PDCP queue manager 955 described with reference to FIG. 9.

In some examples of the method 1300, the operation(s) at block 1330 or 1335 may be performed before, during, or after the operation(s) at block 1320 or 1325, and synchronously or asynchronously with the operation(s) at block 1325.

Following the operation(s) at block 1335, the method 1300 may continue at block 1340 or 1345. At block 1340, the method 1300 may include determining a second buffer reporting value based at least in part on the second subset of the total amount of data and based at least in part on receiving an indication of a transmission error for the second subset of the total amount of data using the second RAT. In some examples, the transmission error may pertain to receipt of a non-acknowledgement (or non-receipt of an acknowledgement) of a transmission of the second subset of the total amount of data. The operation(s) at block 1335 may be performed using the wireless communication manager 720, 820, or 920 described with reference to FIG. 7, 8, or 9, the UE wireless communication manager 1050 described with reference to FIG. 10, or the buffer reporting value manager 845 or 945 described with reference to FIG. 8 or 9.

At block 1345, the method 1300 may include determining a second buffer reporting value based at least in part on the first subset of the total amount of data, the second subset of the total amount of data, an indication of a queue status for the MAC queue associated with the second RAT, an amount of additional data in the PDCP queue since the transmission of the BSR, the at least one parameter received at block 1305, or combinations thereof. The operation(s) at block 1345 may be performed using the wireless communication manager 720, 820, or 920 described with reference to FIG. 7, 8, or 9, the UE wireless communication manager 1050 described with reference to FIG. 10, or the buffer reporting value manager 845 or 945 described with reference to FIG. 8 or 9.

At block 1350, the method 1300 may include transmitting a second BSR including the second buffer reporting value to the first access point. The operation(s) at block 1350 may be performed using the wireless communication manager 720, 820, or 920 described with reference to FIG. 7, 8, or 9, the UE wireless communication manager 1050 described with reference to FIG. 10, or the BSR transmission manager 840 or 940 described with reference to FIG. 8 or 9.

In some examples of the method 1300, the first RAT may include a WWAN technology (e.g., LTE/LTE-A) and the second RAT may include a WLAN technology (e.g., Wi-Fi). In some other examples, the first RAT may include a first WWAN technology (e.g., LTE/LTE-A) and the second RAT may include a second WWAN technology (e.g., 3G or NR). In some examples of the method 1300, the first access point may facilitate the logical traffic connection by performing LTE/Wi-Fi aggregation (e.g., in an LWA mode).

Figure 14:
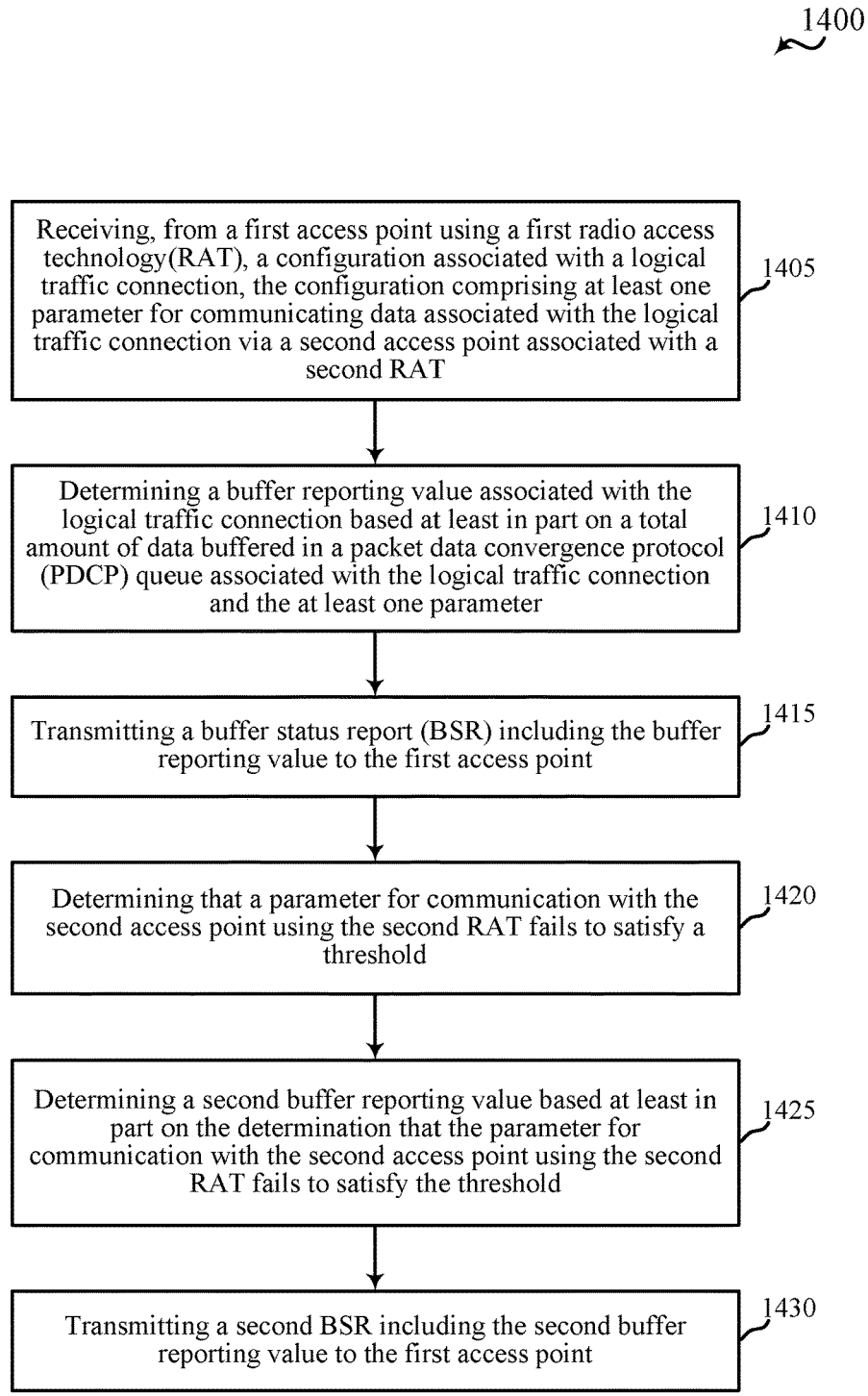
FIG. 14 is a flow chart illustrating an example of a method for wireless communication at a UE, in accordance with various aspects of the present disclosure.

FIG. 14 is a flow chart illustrating an example of a method 1400 for wireless communication at a UE, in accordance with various aspects of the present disclosure. For clarity, the method 1400 is described below with reference to aspects of one or more of the UEs 115, 215, 315, 415, 515, 615, or 1015 described with reference to FIG. 1, 2, 3, 4, 5, 6, or 10, or aspects of one or more of the apparatuses 715 or 815 described with reference to FIG. 7 or 8. In some examples, a UE may execute one or more sets of codes to control the functional elements of the UE to perform the functions described below. Additionally or alternatively, the UE may perform one or more of the functions described below using special-purpose hardware.

At block 1405, the method 1400 may include receiving, from a first access point using a first RAT, a configuration associated with a logical traffic connection. The configuration may include at least one parameter for communicating data associated with the logical traffic connection via a second access point associated with a second RAT. In some examples, the at least one parameter may include at least one of a ratio of data to be transmitted via the second access point and a total amount of data buffered in a PDCP queue associated with the logical traffic connection, a maximum data limit for communicating the data associated with the logical traffic connection via the second access point, a minimum data threshold for communicating the data associated with the logical traffic connection via the second access point, a network identifier of the second access point, or a set of tokens for communicating data associated with the logical traffic connection via the second access point. The operation(s) at block 1405 may be performed using the wireless communication manager 720, 820, or 920 described with reference to FIG. 7, 8, or 9, the UE wireless communication manager 1050 described with reference to FIG. 10, or the logical traffic connection manager 835 or 935 described with reference to FIG. 8 or 9.

At block 1410, the method 1400 may include determining a buffer reporting value associated with the logical traffic connection based at least in part on the total amount of data buffered in the PDCP queue associated with the logical traffic connection and the at least one parameter received at block 1405. The operation(s) at block 1410 may be performed using the wireless communication manager 720, 820, or 920 described with reference to FIG. 7, 8, or 9, the UE wireless communication manager 1050 described with reference to FIG. 10, or the buffer reporting value manager 845 or 945 described with reference to FIG. 8 or 9.

At block 1415, the method 1400 may include transmitting a BSR including the buffer reporting value to the first access point. The operation(s) at block 1415 may be performed using the wireless communication manager 720, 820, or 920 described with reference to FIG. 7, 8, or 9, the UE wireless communication manager 1050 described with reference to FIG. 10, or the BSR transmission manager 840 or 940 described with reference to FIG. 8 or 9.

At block 1420, the method 1400 may include determining that a parameter for communication with the second access point using the second RAT fails to satisfy a threshold. In some examples, the parameter for communication with the second access point using the second RAT may include at least one of a time to transmit (e.g., to the second access point) using the second RAT or a channel metric associated with the second RAT. In some examples, the threshold may include at least one of a time to transmit (e.g., to the first access point) using the first RAT, a threshold time to transmit using the second RAT, or a channel metric threshold associated with the second RAT. In some examples, the time to transmit using the second RAT may exceed one or both of the time to transmit using the first RAT or the threshold time to transmit using the second RAT because of contention to access a channel of a radio frequency spectrum band associated with the second RAT. The operation(s) at block 1420 may be performed using the wireless communication manager 720, 820, or 920 described with reference to FIG. 7, 8, or 9, the UE wireless communication manager 1050 described with reference to FIG. 10, or the second RAT transmission manager 975 described with reference to FIG. 9.

At block 1425, the method 1400 may include determining a second buffer reporting value based at least in part on the determination that the parameter for communication with the second access point using the second RAT fails to satisfy the threshold. The operation(s) at block 1425 may be performed using the wireless communication manager 720, 820, or 920 described with reference to FIG. 7, 8, or 9, the UE wireless communication manager 1050 described with reference to FIG. 10, or the buffer reporting value manager 845 or 945 described with reference to FIG. 8 or 9.

At block 1430, the method 1400 may include transmitting a second BSR including the second buffer reporting value to the first access point. The operation(s) at block 1430 may be performed using the wireless communication manager 720, 820, or 920 described with reference to FIG. 7, 8, or 9, the UE wireless communication manager 1050 described with reference to FIG. 10, or the BSR transmission manager 840 or 940 described with reference to FIG. 8 or 9.

In some examples of the method 1400, the first RAT may include a WWAN technology (e.g., LTE/LTE-A) and the second RAT may include a WLAN technology (e.g., Wi-Fi). In some other examples, the first RAT may include a first WWAN technology (e.g., LTE/LTE-A) and the second RAT may include a second WWAN technology (e.g., 3G or NR). In some examples of the method 1400, the first access point may facilitate the logical traffic connection by performing LTE/Wi-Fi aggregation (e.g., in an LWA mode).

It is noted that the methods 1200, 1300, and 1400 described with reference to FIGS. 12, 13, and 14 show examples of implementations of the techniques described in the present disclosure, and that the operations of the methods 1200, 1300, and 1400 may be rearranged or otherwise modified such that other implementations are possible. In some examples, aspects of the methods 1200, 1300, or 1400 may be combined.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1×, 1×, etc. IS-856 (TIA-856) may be referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDMTm, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. For example, the first RAT may be a first WWAN technology (e.g., 5G) and the second RAT may be a second WWAN technology (e.g., 4G). In particular examples, the first RAT/second RAT may be 3G+4G, 4G+5G, or 3G+5G. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication at a user equipment (UE), comprising:
   receiving, from a first access point using a first radio access technology (RAT), a configuration associated with a logical traffic connection, the configuration comprising at least one parameter for communicating data associated with the logical traffic connection via a second access point associated with a second RAT;
   estimating a subset of a total amount of data buffered in a packet data convergence protocol (PDCP) queue associated with the logical traffic connection expected to be transmitted via the second access point for a time period ending at an expected time of receipt of an uplink grant from the first access point, wherein the subset of the total amount of data is estimated based at least in part on an estimated data rate associated with communicating with the second access point using the second RAT, a minimum data size associated with communicating with the second access point using the second RAT, a maximum data size associated with communicating with the second access point using the second RAT, a history of uplink transmission scheduling by the first access point, or combinations thereof;
   determining a buffer reporting value associated with the logical traffic connection based at least in part on the subset of the total amount of data and the at least one parameter; and
   transmitting a buffer status report (BSR) including the buffer reporting value to the first access point.

2. The method of claim 1, wherein the at least one parameter comprises at least one of a ratio of data to be transmitted via the second access point and the total amount of data buffered in the PDCP queue associated with the logical traffic connection, a maximum data limit for communicating the data associated with the logical traffic connection via the second access point, a minimum data threshold for communicating the data associated with the logical traffic connection via the second access point, a network identifier of the second access point, or a set of tokens for communicating data associated with the logical traffic connection via the second access point.

3. The method of claim 1, further comprising:
receiving an uplink grant for transmitting to the first access point using the first RAT, the uplink grant based at least in part on the buffer reporting value;
transmitting a first subset of the total amount of data to the first access point using the first RAT, in accordance with the received uplink grant; and
pushing a second subset of the total amount of data to a medium access control (MAC) queue associated with the second RAT.

4. The method of claim 3, further comprising:
maintaining the second subset of the total amount of data in the PDCP queue; and
determining a second buffer reporting value based at least in part on the second subset of the total amount of data, and based at least in part on receiving an indication of a transmission error for the second subset of the total amount of data using the second RAT.

5. The method of claim 3, further comprising:
determining a second buffer reporting value based at least in part on the first subset of the total amount of data, the second subset of the total amount of data, an indication of a queue status for the MAC queue associated with the second RAT, an amount of additional data in the PDCP queue since the transmission of the BSR, the at least one parameter, or combinations thereof; and
transmitting a second BSR including the second buffer reporting value to the first access point.

6. The method of claim 1, further comprising:
determining that a parameter for communication with the second access point using the second RAT fails to satisfy a threshold; and
determining a second buffer reporting value based at least in part on the determination that the parameter for communication with the second access point using the second RAT fails to satisfy the threshold.

7. The method of claim 6, wherein the parameter for communication with the second access point using the second RAT comprises at least one of a time to transmit using the second RAT or a channel metric associated with the second RAT.

8. The method of claim 1, wherein the first RAT comprises a wireless wide area network (WWAN) technology and the second RAT comprises a wireless local area network (WLAN) technology.

9. The method of claim 1, wherein the first RAT comprises a first wireless wide area network (WWAN) technology and the second RAT comprises a second WWAN technology.

10. An apparatus for wireless communication at a user equipment (UE), comprising:
means for receiving, from a first access point using a first radio access technology (RAT), a configuration associated with a logical traffic connection, the configuration comprising at least one parameter for communicating data associated with the logical traffic connection via a second access point associated with a second RAT, wherein the subset of the total amount of data is estimated based at least in part on an estimated data rate associated with communicating with the second access point using the second RAT, a minimum data size associated with communicating with the second access point using the second RAT, a maximum data size associated with communicating with the second access point using the second RAT, a history of uplink transmission scheduling by the first access point, or combinations thereof;
means for estimating a subset of a total amount of data buffered in a packet data convergence protocol (PDCP) queue associated with the logical traffic connection expected to be transmitted via the second access point for a time period ending at an expected time of receipt of an uplink grant from the first access point;
means for determining a buffer reporting value associated with the logical traffic connection based at least in part on the subset of the total amount of data and the at least one parameter; and
means for transmitting a buffer status report (BSR) including the buffer reporting value to the first access point.

11. The apparatus of claim 10, wherein the at least one parameter comprises at least one of a ratio of data to be transmitted via the second access point and the total amount of data buffered in the PDCP queue associated with the logical traffic connection, a maximum data limit for communicating the data associated with the logical traffic connection via the second access point, a minimum data threshold for communicating the data associated with the logical traffic connection via the second access point, or a network identifier of the second access point, or a set of tokens for communicating data associated with the logical traffic connection via the second access point.

12. The apparatus of claim 10, further comprising:
means for receiving an uplink grant for transmitting to the first access point using the first RAT, the uplink grant based at least in part on the buffer reporting value;
means for transmitting a first subset of the total amount of data to the first access point using the first RAT, in accordance with the received uplink grant; and
means for pushing a second subset of the total amount of data to a medium access control (MAC) queue associated with the second RAT.

13. The apparatus of claim 12, further comprising:
means for maintaining the second subset of the total amount of data in the PDCP queue; and
means for determining a second buffer reporting value based at least in part on the second subset of the total amount of data, and based at least in part on receiving an indication of a transmission error for the second subset of the total amount of data using the second RAT.

14. The apparatus of claim 12, further comprising:
means for determining a second buffer reporting value based at least in part on the first subset of the total amount of data, the second subset of the total amount of data, an indication of a queue status for the MAC queue associated with the second RAT, an amount of additional data in the PDCP queue since the transmission of the BSR, the at least one parameter, or combinations thereof; and
means for transmitting a second BSR including the second buffer reporting value to the first access point.

15. The apparatus of claim 10, further comprising:
means for determining that a parameter for communication with the second access point using the second RAT fails to satisfy a threshold; and
means for determining a second buffer reporting value based at least in part on the determination that the parameter for communication with the second access point using the second RAT fails to satisfy the threshold.

16. The apparatus of claim 10, wherein the parameter for communication with the second access point using the second RAT comprises at least one of a time to transmit using the second RAT or a channel metric associated with the second RAT.

17. The apparatus of claim 10, wherein the first RAT comprises a wireless wide area network (WWAN) technology and the second RAT comprises a wireless local area network (WLAN) technology.

18. The apparatus of claim 10, wherein the first RAT comprises a first cellular technology and the second RAT comprises a second cellular technology.

19. An apparatus for wireless communication at a user equipment (UE), comprising:
a processor; and
memory in electronic communication with the processor; the processor and the memory configured to:
estimate a subset of a total amount of data buffered in a packet data convergence protocol (PDCP) queue associated with the logical traffic connection expected to be transmitted via the second access point for a time period ending at an expected time of receipt of an uplink grant from the first access point, wherein the subset of the total amount of data is estimated based at least in part on an estimated data rate associated with communicating with the second access point using the second RAT, a minimum data size associated with communicating with the second access point using the second RAT, a maximum data size associated with communicating with the second access point using the second RAT, a history of uplink transmission scheduling by the first access point, or combinations thereof;
determine a buffer reporting value associated with the logical traffic connection based at least in part on the subset of the total amount of data and the at least one parameter; and
transmit a buffer status report (BSR) including the buffer reporting value to the first access point.

20. The apparatus of claim 19, wherein the processor and the memory are configured to:
receive an uplink grant for transmitting to the first access point using the first RAT, the uplink grant based at least in part on the buffer reporting value;
transmit a first subset of the total amount of data to the first access point using the first RAT, in accordance with the received uplink grant; and
push a second subset of the total amount of data to a medium access control (MAC) queue associated with the second RAT.

21. The apparatus of claim 20, wherein the processor and the memory are configured to:
maintain the second subset of the total amount of data in the PDCP queue; and
determine a second buffer reporting value based at least in part on the second subset of the total amount of data, and based at least in part on receiving an indication of a transmission error for the second subset of the total amount of data using the second RAT.

22. The apparatus of claim 20, wherein the processor and the memory are configured to:
determine a second buffer reporting value based at least in part on the first subset of the total amount of data, the second subset of the total amount of data, an indication of a queue status for the MAC queue associated with the second RAT, an amount of additional data in the PDCP queue since the transmission of the BSR, the at least one parameter, or combinations thereof; and
transmit a second BSR including the second buffer reporting value to the first access point.

23. The apparatus of claim 19, wherein the processor and the memory are configured to:
determine that a parameter for communication with the second access point using the second RAT fails to satisfy a threshold; and
determine a second buffer reporting value based at least in part on the determination that the parameter for communication with the second access point using the second RAT fails to satisfy the threshold.

24. A non-transitory computer-readable medium storing computer-executable code for wireless communication at a user equipment (UE), the code executable by a processor to:
receive, from a first access point using a first radio access technology (RAT), a configuration associated with a logical traffic connection, the configuration comprising at least one parameter for communicating data associated with the logical traffic connection via a second access point associated with a second RAT, wherein the subset of the total amount of data is estimated based at least in part on an estimated data rate associated with communicating with the second access point using the second RAT, a minimum data size associated with communicating with the second access point using the second RAT, a maximum data size associated with communicating with the second access point using the second RAT, a history of uplink transmission scheduling by the first access point, or combinations thereof;
estimate a subset of a total amount of data buffered in a packet data convergence protocol (PDCP) queue associated with the logical traffic connection expected to be transmitted via the second access point for a time period ending at an expected time of receipt of an uplink grant from the first access point;
determine a buffer reporting value associated with the logical traffic connection based at least in part on the subset of the total amount of data and the at least one parameter; and
transmit a buffer status report (BSR) including the buffer reporting value to the first access point.

25. A method for wireless communication at a user equipment (UE), comprising:
receiving, from a first access point using a first radio access technology (RAT), a configuration associated with a logical traffic connection, the configuration comprising at least one parameter for communicating data associated with the logical traffic connection via a second access point associated with a second RAT, wherein the at least one parameter comprises at least one of a ratio of data to be transmitted via the second access point and the total amount of data buffered in the PDCP queue associated with the logical traffic connection, a maximum data limit for communicating the data associated with the logical traffic connection via the second access point, a minimum data threshold for communicating the data associated with the logical traffic connection via the second access point, a network identifier of the second access point, or a set of tokens for communicating data associated with the logical traffic connection via the second access point;

estimating a subset of a total amount of data buffered in a packet data convergence protocol (PDCP) queue associated with the logical traffic connection expected to be transmitted via the second access point for a time period ending at an expected time of receipt of an uplink grant from the first access point;

determining a buffer reporting value associated with the logical traffic connection based at least in part on the subset of the total amount of data and the at least one parameter; and transmitting a buffer status report (BSR) including the buffer reporting value to the first access point.

26. The method of claim 25, further comprising:
receiving an uplink grant for transmitting to the first access point using the first RAT, the uplink grant based at least in part on the buffer reporting value;
transmitting a first subset of the total amount of data to the first access point using the first RAT, in accordance with the received uplink grant; and
pushing a second subset of the total amount of data to a medium access control (MAC) queue associated with the second RAT.

27. The method of claim 25, further comprising:
determining that a parameter for communication with the second access point using the second RAT fails to satisfy a threshold; and
determining a second buffer reporting value based at least in part on the determination that the parameter for communication with the second access point using the second RAT fails to satisfy the threshold.

* * * * *